United States Patent [19]
Heberger et al.

[11] Patent Number: 5,968,664
[45] Date of Patent: Oct. 19, 1999

[54] POLYMERIC COATED SUBSTRATES FOR PRODUCING OPTICALLY VARIABLE PRODUCTS

[75] Inventors: John M. Heberger, Greer; Stephen J. Gust; R. Scott Caines, both of Greenville, all of S.C.

[73] Assignee: Mitsubishi Polyester Film, LLC, Greer, S.C.

[21] Appl. No.: 08/967,411

[22] Filed: Nov. 11, 1997

[51] Int. Cl.[6] ................................. B29C 33/40
[52] U.S. Cl. ................ 428/463; 264/1.1; 264/221; 427/154; 427/155; 427/250; 427/393.5; 427/404; 427/412.1; 428/522
[58] Field of Search ............. 264/221, 1.1; 427/154, 427/155, 250, 393.5, 404, 412.1; 428/463, 522

[56] References Cited

U.S. PATENT DOCUMENTS

| | | | |
|---|---|---|---|
| 3,819,394 | 6/1974 | Schnebel et al. | 427/155 |
| 3,821,156 | 6/1974 | Farrar | 260/40 |
| 3,839,066 | 10/1974 | Brenner | 427/155 |
| 3,884,870 | 5/1975 | Dodson et al. | 260/40 |
| 3,900,606 | 8/1975 | Mandell | 427/155 |
| 4,027,345 | 6/1977 | Fujisawa et al. | 427/154 |
| 4,434,010 | 2/1984 | Ash | 106/291 |
| 4,930,866 | 6/1990 | Berning et al. | 350/320 |
| 5,059,245 | 10/1991 | Philips et al. | 106/22 |
| 5,059,454 | 10/1991 | Todd et al. | 427/259 |
| 5,084,351 | 1/1992 | Philips et al. | 428/411.1 |
| 5,096,784 | 3/1992 | Culbertson et al. | 428/482 |
| 5,114,739 | 5/1992 | Culbertson et al. | 427/40 |
| 5,135,812 | 8/1992 | Phillips et al. | 428/403 |
| 5,171,363 | 12/1992 | Phillips et al. | 106/22 |
| 5,279,657 | 1/1994 | Phillips et al. | 106/22 |
| 5,281,480 | 1/1994 | Phillips et al. | 428/412 |
| 5,376,406 | 12/1994 | Asanuma et al. | 427/404 |
| 5,383,995 | 1/1995 | Phillips et al. | 156/230 |
| 5,750,269 | 5/1998 | Park | 427/154 |

*Primary Examiner*—Janyce Bell

[57] ABSTRACT

A method is provided for forming a strippable or dissolvable release coating on the surface of substrate such as a flexible polymeric film or web. The release coating is subsequently coated with a layer of material and then dissolved in a solvent to release the layer. The release coating is made from a copolymer of methylmethacrylate and ethylacrylate or from a homopolymer of polyacrylic acid. Release coatings made of methylmethacrylate and ethylacrylate copolymers having glass transition temperatures of about 60° C. or greater, or made of a ipolyacrylic acid homopolymer having a glass transition temperature of about 100° C. or higher, are also provided. The release coatings provide excellent supporting substrates for the formation of an overcoated metallized layer, are readily strippable in acetone, and can be formed during an in-line process which begins with drawing a flexible film or web from a molten polymeric material. Methods are also provided for making metallized layers used in the production of optically variable flakes and devices.

45 Claims, No Drawings

POLYMERIC COATED SUBSTRATES FOR PRODUCING OPTICALLY VARIABLE PRODUCTS

FIELD OF THE INVENTION

The present invention relates to products having solvent strippable release coatings which can be used as supports for the formation of a metallized layer thereon. More specifically, the present invention relates to reclaimable polyester film products having an acetone strippable coating and methods for making coated products which can be used in the production of optically variable layers and flakes.

BACKGROUND OF THE INVENTION

Optically variable flakes are used in paints and inks for obtaining a color shift between two distinct colors at first and second angles of incident light. Optically variable pigments (OVP) incorporating such flakes play an important role in the security printing industry. By physically aligning optically variable flakes incorporated in an ink or paint, a dramatic and uniform color shift can be created which cannot be reproduced by photocopiers and printers. This desirable feature has led many nations to use optically variable pigments in their currencies.

U.S. Pat. No. 4,434,010 to Ash teaches methods of forming optically variable flakes, inks, paints and devices. An optical coating is formed by vacuum coating a metal layer on a flexible release coating or web which is soluble in a preselected liquid. After the optical coating is formed, the coated web is passed through the preselected liquid and the web is dissolved away from the optical coating. Depending upon the desired application, the remaining optical coating can be secured on a substrate to form a replicated coating or it may be broken into or caused to form thin film flakes which may be recovered and used in inks and paints. The patent discloses the use of water soluble coatings or webs made of polyethylene oxide, methyl-hydroxy-propyl cellulose, or polyvinyl alcohol resin. The patent also discloses webs made of acrylic plastic materials which are soluble in organic solvents such as acetone or methyl ethyl ketone. Methods disclosed for making inks require a flake treatment step to remove residual release coating material and stripping solvent from the produced flakes.

U.S. Pat. Nos. 5,059,245, 5,084,351, 5,135,812, 5,171,363, 5,279,657, 5,281,480 and 5,383,995 to Phillips, et al. each disclose a method of making optically variable ink wherein a forming substrate or web comprising a relatively insoluble flexible material such as polyethylene terephthalate is coated with a solvent-soluble acrylic polymer known as THERMAK 517-1. The composition of the acrylic polymer is not disclosed. Solvents disclosed for dissolving the acrylic polymer are acetone and methyl ethyl ketone. Complete polymer removal via either solvent is not reported, and after filtering, the resultant flakes are sprayed with fresh solvent to remove traces of the soluble polymer.

The use of acrylic polymers as acetone or methyl ethyl ketone soluble web materials has been discussed in U.S. Pat. Nos. 5,059,245 and 5,084,351 both to Phillips, et al. However, it has been found that the specifically suggested polymethylmethacrylate disclosed in these patents suffers in general from an inability to be even slightly dissolved by acetone in a single pass through the solvent.

Polymeric materials for release coatings should be able to form a uniformly thin coating. The molecular weight and glass transition properties of the polymeric material should render the material stable at the high temperatures associated with vacuum deposition of metal optical layers, without causing defects in the optical layers and in flakes produced from such layers. In addition, preferred polymeric coating materials should be soluble in aqueous solutions and should emulsify into water-based emulsions, and thus not require the use of potentially dangerous solvents to form coating solutions thereof. Furthermore, the polymeric material should form a clear and homogeneous release coating which will not detrimentally affect properties such as clarity and uniformity in topcoated or overcoated metallized optical layers.

The present invention provides the aforementioned desired properties in a release coating material and provides methods of making high-quality, high-clarity topcoated metallized layers having predictable and repeatable properties. The present invention provides a strippable, reclaimable release coating for forming optically variable flakes and devices, which: (1) can be coated on a substrate to form a uniformly thin film layer, (2) is stable under conditions associated with the vacuum deposition of metals, (3) can be formed from a relatively safe, non-flammable aqueous coating emulsion, and (4) can readily and completely dissolve in a single pass through a common, inexpensive and relatively safe organic solvent such as acetone to form metallic flakes from metals coated thereon. Optical, metallic layers of high quality can be formed on the polymeric coating and easily separated from the coating for subsequent use in optically variable inks, paints, pigments and devices.

SUMMARY OF THE INVENTION

The present invention provides strippable, reclaimable release coatings which are soluble in a preselected solvent and useful in the production of optically variable layers and flakes. The present invention also provides methods for the production of such coatings. The methods of the invention comprise providing a substrate having a surface, forming a release coating on the surface, and dissolving the release coating with a stripping solvent. According to embodiments of the invention, release coatings for such purposes comprise copolymers of methyl-methacrylate (MMA) and ethylacrylate (EA), or alternatively comprise polyacrylic acid homopolymers. Such copolymers and homopolymers have been found to provide high quality, clear release coatings according to the present invention. More preferred release coatings according to the invention comprise copolymers of methylmethacrylate (MMA) and ethylacrylate (EA), or polyacrylic acid homopolymers, which have glass transition temperatures of 60° C. or higher.

According to embodiments of the invention, a reclaimable, clear, and acetone-strippable release coating is provided which comprises a copolymer of methylmethacrylate and ethylacrylate, preferably such a copolymer having a glass transition temperature ($T_g$) of greater than or equal to 60° C. Overcoated metallized layers produced on and released from preferred embodiments of such coatings consistently exhibit a high quality, at least substantially blemish free, and desirable clear metal foil appearance. According to the invention, it has been found that a sharp increase in metal foil appearance occurs with metallized layers made from MMA/EA copolymers having glass transition temperatures of at least 60° C. Acceptable acetone strippability may be provided by coatings of MMA/EA copolymers having $T_g$'s as low as 29° C., or lower. However, it has been determined, according to the invention, that copolymers of MMA and EA having $T_g$'s below 60° C. tend to form hazy release coatings which may detrimentally affect the clarity and foil appearance of an overcoated, or topcoated, optically variable metallized layer. Nonetheless coatings of such copolymers can still be useful as acetone strippable coatings, particularly when high quality overcoated metallized layers are not necessary.

According to other embodiments of the invention, polyacrylic acid homopolymers are used to form release coatings with excellent clarity and quality, and which can advantageously be used to form non-hazy overcoated optically variable layers of high quality and predictability. More preferred polyacrylic acid homopolymers for use according to the invention are those having $T_g$'s of 60° C. or greater, more preferably, 100° C. or greater.

Herein, the term "polyacrylic acid homopolymer" refers to at least substantially pure homopolymeric polymers of 2-propenoic acid (acrylic acid), but also encompasses copolymers of 2-propenoic acid and minor amounts of other monomers which together with 2-propenoic acid provide a strippable coating composition that preferably can be used to produce a clear overcoated metallized layer. Preferably, the homopolymers comprise greater than 80% by weight polymerized 2-propenoic acid, more preferably greater than 90% by weight, and even more preferably essentially pure homopolymeric polymers. Preferably the polyacrylic acid homopolymers incorporate only enough free radical initiator to provide a weight average molecular weight of at least about 10,000.

According to other embodiments of the invention, polyacrylic acid homopolymer coatings are formed from a hydrophilic colloidal solution of polyacrylic acid homopolymer having weight average molecular weights in the range of from about 10,000 to about 200,000, with the range of from about 40,000 to about 80,000 being preferred. Polyacrylic acid homopolymers having $T_g$'s of greater than or equal to 100° C. are particularly preferred for release coating materials according to embodiments of the invention due to the ready strippability of such coatings in acetone and the uniform flakes that form upon breaking-up an overcoated metallized layers. Metallized layers topcoated on such release coatings consistently exhibit excellent clarity with little or no blemishes or deformities, as well as consistent and uniform surface morphology, and can be formed into flat optical flakes. These qualities make the release coatings of the invention ideal for use in forming optically variable flakes and film layers.

Advantageously, the release coating formulations according to the present invention are reclaimable and can be applied to a supporting substrate as a relatively safe aqueous solution or emulsion of the MMA/EA copolymer or polyacrylic acid homopolymer. Upon coating and drying the solution or emulsion, the resultant coating is in the form of a uniformly thin and continuous film. When metallized layers of optically variable materials are deposited on the release coated substrate and the release coating is dissolved or stripped in the solvent, an optically variable material layer is released, or flakes of such a layer.

According to embodiments of the invention, acetone is a preferred solvent for stripping the inventive release coating formulations. Polyethylene terephthalate is a preferred supporting substrate material on which the release coatings of the invention can be formed.

According to yet other embodiments of the invention, an optically variable material layer is deposited on the release layer and breaks-up into flakes as the release coating is removed, or is converted to a flake form. The flakes are then subsequently used to make optically variable inks, pigments, paints and coatings. According to yet another embodiment, the optically variable layer is released as a continuous coating which is used in the manufacture of a replicated coating.

Overcoated metallized layers produced on the MMA/EA release coatings of the present invention exhibit excellent, uniform surface morphology, and produce substantially flat, uniform metallized layer flakes upon dissolution and removal of the release coating. Overcoated metallized layers produced on release coatings of the present invention comprising MMA/EA copolymers or polyacrylic acid homopolymers, having $T_g$'s of about 60° C. or higher, exhibit far superior and uniform surface morphology, better clarity, and flatter metallized layer flakes when compared to layers and flakes produced from release coatings of MMA/EA copolymers and polyacrylic acid homopolymers, having $T_g$'s lower than 60° C.

According to yet other embodiments of the invention, the present methods provide an in-line manufacturing apparatus wherein a flexible substrate or film of polyethylene terephthalate or other polymeric material is drawn, uniaxially stretched, coated with dissolvable release coating according to the invention, and then stretched in the transverse direction.

The present invention also provides structures made in accordance with the present methods. Among the structures within the realm of the invention, rolls of flexible substrate or web material or film having a release coating thereon are provided.

DETAILED DESCRIPTION OF THE INVENTION

A release coating comprising a strippable polymer is continuously formed on the surface of a substrate for producing optically variable products. The release coating adhesively receives a metallized coating without substantially destroying the releasability of the metallized coating from the substrate. The metallized layer is formed or deposited on the release coating and the release coating is dissolved with a preselected solvent. According to embodiments of the invention, the release coating preferably comprises a polymer selected from one of two groups of polymers: (1) copolymers of methylmethacrylate (MMA) and ethylacrylate (EA), and (2) polyacrylic acid homopolymers. According to some embodiments of the invention, a release coating is provided comprising a MMA/EA copolymer or a polyacrylic acid homopolymer, having a glass transition temperature ($T_g$) of 60° C. or greater. According to embodiments of the invention wherein the release coating comprises a polyacrylic acid homopolymer, it is preferred that the homopolymer has a $T_g$ of 100° C. or higher. For either group of polymers, the release coating may be applied as a solution or emulsion and then dried to form a uniformly thin and continuous release coating which is clear, acetone strippable, and does not substantially adversely affect reclaimability of a coated polyester film substrate.

Herein, the term "polyacrylic acid homopolymer" refers to at least substantially pure homopolymeric polymers of 2-propenoic acid (acrylic acid), but also encompasses copolymers of 2-propenoic acid and minor amounts of other monomers which together with 2-propenoic acid provide a strippable coating composition that preferably can be used to produce a clear overcoated metallized layer. Preferably, the homopolymers comprise greater than 80% by weight polymerized 2-propenoic acid, more preferably greater than 90% by weight, and even more preferably essentially pure homopolymeric polymers. Preferably the polyacrylic acid homopolymers incorporate only enough free radical initiator to provide a weight average molecular weight of at least about 10,000. Homopolymers containing more significant amounts of initiator, for example, sufficient initiator to limit the weight average molecular weight of the homopolymer to less than about 10,000, tend to form non-strippable coating compositions. Despite the fact that some initiator or comonomer may be polymerized together with the 2-propenoic acid, the polymer is nonetheless referred to herein as a polyacrylic acid homopolymer.

If the release coating polymer is not essentially pure homopolymeric 2-propenoic acid, but rather is a copolymer which additionally comprises the polymerization product of one or more comonomer, the copolymer preferably contains 20% by weight or less of the one or more comonomer. If present, the comonomer must be of such nature that the resultant copolymer is at least slightly strippable in a stripping solvent, for example, acetone. If present, the comonomer preferably does not adversely affect the strippability of the coating composition relative to the strippability of an essentially pure homopolymeric 2-propenoic acid coating composition. Preferably, if a comonomer is present in the coating composition, the comonomer does not adversely affect the clarity of an overcoated metallized layer.

An exemplary additional comonomer system which may be polymerized with essentially pure 2-propenoic acid monomer to form a release coating composition is an MMA/EA comonomer system, for example, any of the MMA/EA comonomer systems described herein. Prepolymerized blends of polyacrylic acid homopolymer and MMA/EA copolymer may also be used as release coating compositions according to some embodiments of the invention. If a comonomer is used together with a 2-propenoic acid monomer, the comonomer should be compatible with the 2-propenoic acid monomer. Mixed emulsions or solutions of the two or more different comonomers should be pH compatible and may further include surfactants or components that render the emulsion, solution or mixture colloidal and/or hydrophilic. Likewise, if a blend of 2-propenoic acid homopolymer and another polymer or copolymer is used as a release coating composition, the blended polymer or copolymer should be compatible with the 2-propenoic acid homopolymer. Mixed blends or emulsions of the two or more different polymers should be pH compatible and may further include surfactants or components that render the blend or mixed emulsion or solution colloidal and/or hydrophilic.

According to embodiments of the invention, the glass transition temperature of the release coating polymer is selected to improve the appearance and predictability of a subsequently formed metallized layer on the release coating. It has been discovered, according to such embodiments of the invention, that higher glass transition temperature polymers generally produce clearer, less hazy or less cloudy metallized layers when formed thereon. Metallized layers made in accordance with the present invention exhibit better metallized foil appearance, and optically variable pigments made in accordance with the invention exhibit better dispersibility, when compared to films and pigments made from processes using lower $T_g$ polyacrylic acid release coating polymers. MMA/EA copolymers and polyacrylic acid homopolymers, having $T_g$'s of less than 60° C., tend to produce cloudier metallized layers when formed thereon, compared to higher $T_g$ polymers, rendering coatings made from lower $T_g$ polymers less desirable for applications wherein metallized foil appearance is critical. Cloudy metallized layers have poor reflectivity, and poor spectral shifting properties making them inappropriate for some uses.

It has been found, according to the invention, that polymers with higher glass transition temperatures form harder release coatings which are less readily deformed, thus providing clearer, more stable release coatings which can better withstand the high temperature conditions of a metallization process. According to the present invention, it has been determined that release coatings made of MMA/EA copolymers or polyacrylic acid homopolymers having glass transition temperatures of greater than or equal to 60° C. exhibit a dramatic improvement in deformation resistance and clarity compared to lower $T_g$ polymeric coatings. The improved deformation resistance and clarity is particularly pronounced when comparing the higher $T_g$ inventive coatings to lower $T_g$ coatings, which have been exposed to metallization processes such as a vacuum deposition of a metallized aluminum layer. Release coatings made of MMA/EA copolymers having $T_g$'s of just five degrees under the 60° C. lower limit of some embodiments of the invention tend to exhibit dramatically increased deformation and haziness compared to the release coatings of the present invention having $T_g$'s of 60° C. or greater.

MMA/EA copolymers which have $T_g$'s of 60° C. or greater include those copolymers made from about 50% by weight to about 90% by weight methylmethacrylate (MMA) monomer and from about 10% by weight to about 50% by weight ethylacrylate (EA) monomer, said percentages adding up to 100%. More preferred copolymers for forming the release coatings of the invention are those made from about 73.5% to about 85% by weight MMA and from about 15% to about 26.5% by weight EA, said percentages adding up to 100% by weight. Corresponding copolymer $T_g$'s of from about 60° C. to about 70° C. are likewise preferred. Emulsions of copolymers comprised of more than about 85% MMA and less than about 15% EA tend to exhibit emulsion stability problems and are therefore less preferred.

Copolymers made from less than about 73.5% by weight methylmethacrylate (MMA) monomer and more than about 26.5% by weight ethylacrylate (EA) monomer do not exhibit $T_g$'s of greater than or equal to 60° C., as can be seen from Table I below. Those copolymers having $T_g$'s of under 60° C. do not provide the dramatically increased consistent quality in a metallized overlayer that is provided by the polymeric release coatings of the present invention having $T_g$'s of greater than or equal to about 60° C. Nonetheless, acetone strippability of all tested MMA/EA copolymers was observed. Some of the emulsions tested for $T_g$ also contained a butylacrylate (BA) component but did not provide adequately strippable coating formulations or the target $T_g$ value of 60° C.

In each emulsion, nonionic and anionic surfactants were included. The nonionic surfactant was Triton X-405, a member of the chemical family of alkylaryl polyether alcohols, available from Union Carbide, Danbury, Connecticut. Each emulsion contained about 22% by weight dry Triton X-405 surfactant based on the dry copolymer solids weight in the emulsion. The anionic surfactant was sodium lauryl sulfate, present in an amount of about 2.6% by weight dry sodium lauryl sulfate surfactant based on the dry copolymer solids weight of the emulsion.

TABLE I

| EMULSION | COMPOSITION | | | MOLECULAR WEIGHT | $T_g$ °C. |
|---|---|---|---|---|---|
| | MMA | EA | BA | | |
| 1 | 62.8 | 37.2 | — | $10.7 \times 10^5$ | 45 |
| 2 | 62.8 | 37.2 | — | $1.55 \times 10^5$ | 45 |
| 3 | 50 | 50 | — | $11.8 \times 10^5$ | 29 |
| 4 | 65 | — | 35 | $9.42 \times 10^5$ | 28 |
| 5 | 50 | 50 | — | $1.37 \times 10^5$ | 29 |
| 6 | 65 | — | 35 | $5.30 \times 10^5$ | 28 |
| 7 | 30 | 70 | — | $> 10 \times 10^5$ | 6 |
| 8 | 50 | 50 | — | from $1.0 \times 10^5$ to $2.0 \times 10^5$ | 29 |
| 9 | 56.4 | 43.6 | — | from $1.0 \times 10^5$ to $2.0 \times 10^5$ | 37 |
| 10 | 62.8 | 37.2 | — | from $1.0 \times 10^5$ to $2.0 \times 10^5$ | 45 |
| 11 | 66 | 34 | — | from $1.0 \times 10^5$ to $2.0 \times 10^5$ | 50 |
| 12 | 69 | 31 | — | from $1.0 \times 10^5$ to $2.0 \times 10^5$ | 55 |
| 13 | 73.5 | 26.5 | — | from $1.0 \times 10^5$ to $2.0 \times 10^5$ | |
| 14 | 77 | 23 | — | from $1.0 \times 10^5$ to $2.0 \times 10^5$ | 65 |
| 15 | 80 | 20 | — | from $1.0 \times 10^5$ to $2.0 \times 10^5$ | 70 |

As is discussed in the Examples below, MMA/EA copolymers having low molecular weights are preferred to copolymers having the same monomer component ratio and $T_g$ but higher molecular weights. Acetone strippability has been found to be generally better for MMA/EA copolymers having molecular weights of about $1.0 \times 10^5$ when compared to copolymers of the same monomer component ratio and $T_g$ but which have molecular weights of about $1.0 \times 10^6$. The lower molecular weight copolymers enable a thinner coating thickness, lower solids contents emulsions, and strip more easily in acetone and other stripping solvents than higher molecular weight copolymers of the same compositional ratio and $T_g$. By using known catalysts and known catalytic procedures, the molecular weight of the MMA/EA copolymer can be controlled to be in the preferred lower molecular weight range of from about $1.0 \times 10^5$ to about $2.0 \times 10^5$. Weight average molecular weights for MMA/EA copolymers used in the release coatings of the present invention may be from about 50,000 to about 1,500,000, preferably from about 100,000 to about 1,500,000, for example, the range of from about 130,000 to about 1,200,000. Higher molecular weight copolymers may be used but would require longer stripping times or more potent and dangerous stripping solvents to achieve the same degree of strippability as achieved by copolymers in the preferred molecular weight range. According to embodiments of the invention, the molecular weight range of from about 100,000 g/mol to about 200,000 g/mol is most preferred.

According to some embodiments of the invention, solutions, instead of emulsions, may be used for the release coating formulations. Solvents including methanol, ethanol, isopropanol, acetone, methyl ethyl ketone, ethyl acetate, methylene chloride, some alcohol-water mixtures, 2-amino-2-methyl-1-propanol (AMP), and mixtures thereof may be used to form coating solutions of the coating polymers of the invention. However, for safety reasons and convenience, aqueous solutions and aqueous emulsions are preferred.

According to embodiments of the invention wherein the release coating comprises a MMA/EA copolymer, a coating emulsion of the copolymer is preferably employed and may be applied to the substrate and dried to form the release coating.

Copolymers for the release coating formulations according to some embodiments of the invention are copolymers consisting essentially of MMA and EA. According to some embodiments, copolymers of MMA and EA having $T_g$'s of greater than or equal to 60° C. are used. Preferred formulations according to embodiments of the invention are substantially or completely free of any cross-linking agent. According to some embodiments of the invention, the release coating formulations of the present invention consist essentially of copolymers of MMA and EA having $T_g$'s of greater than or equal to 60°C., and being substantially free of any additives which may volatilize and degas during vacuum deposition of a metallized overcoat layer.

Release coatings made from copolymers of MMA and EA may be formed by applying and drying an emulsion containing the copolymer. According to some embodiments of the invention, coating emulsions may be prepared by an emulsion polymerization technique. Emulsion polymerization is a conventional polymer synthesis process which may be carried out at atmospheric pressure and at a temperature of from about 40° C. to about 60° C. In practice, an aqueous emulsion of the reactant monomers, and surfactants, is slowly metered into an aqueous solution containing a redox initiator system as well as additional quantities of anionic and nonionic surfactants.

A nonionic surfactant may be added to the coating emulsion in an amount sufficient to prevent post-emulsion polymerization agglomeration of the copolymer particles and resultant grit formation. Exemplary amounts of nonionic surfactant to be added may range from about 10% by weight to about 30% by weight, based upon the dry weight of the reactant monomers to be copolymerized. More preferably, the amount of nonionic surfactant to be added to the emulsion may be from about 20% by weight to about 25% by weight, based upon the dry weight of the reactant monomers to be copolymerized. Less than about 10% by weight nonionic surfactant, based on the dry weight of monomers, results in emulsion instability. More than about 30% by weight nonionic surfactant, based on the dry weight of monomers, noticeably adversely affects the stripping and glass transition properties of the resultant coating.

Nonionic surfactants which may be used according to embodiments of the present invention include alkylaryl polyether alcohols, and alkylphenol ethoxylates having a nominal degree of polymerization of from about 15 to about 100. Alkylaryl polyether alcohols and alkylphenol ethoxylates are well known surfactants which are commercially available from several suppliers, including Rohm & Haas Company in Philadelphia, Pennsylvania; Union Carbide Corporation in New York, N.Y.; and the Whitestone Chemical Department of BASF, in Spartanburg, S.C. An exemplary nonionic surfactant for use in the present invention is octylphenol ethoxylate having a nominal degree of polymerization of about 40.

According to embodiments of the invention, an anionic surfactant may be added to the emulsion in an amount sufficient to emulsify the acrylic comonomers during the polymerization reaction and to stabilize the reaction mixture generally. Exemplary amounts of anionic surfactant to be added may range from about 0.1% by weight to about 5% by weight, based upon the dry weight of the reactant monomers to be copolymerized, to produce good micelle formation. More preferably, the amount of anionic surfactant to be added to the emulsion may be from about 2% by weight to about 3% by weight, based upon the dry weight of the reactant monomers to be copolymerized. Less than about 0.1% by weight anionic surfactant, based on the dry weight of monomers, results in an unstable emulsion. More than about 5% by weight anionic surfactant, based on the dry weight of monomers, does not improve the coating. Exemplary anionic surfactants which may be employed in the present invention include sodium lauryl sulfate and sodium dodecylbenzene sulfonate.

Nonionic and anionic surfactants are further described in U.S. Pat. Nos. 5,096,784 and 5,114,739, to Culbertson, et al., which are both incorporated herein by reference in their entireties.

Typical initiators for emulsion polymerization reactions are peroxide compounds such as lauryl peroxide, benzoyl peroxide, methyl ethyl ketone peroxide, and the like.

As in all emulsion polymerization reactions, water quality is an important consideration. Deionized water should be used since the presence of certain multivalent ions in uncontrolled concentrations can interfere with both the initiation process and the action of the emulsifier.

As the monomer emulsion is slowly metered into the water containing the surfactants and the initiator, copolymerization of the methylmethacrylate and the ethylacrylate monomers begins, thereby forming methylmethacrylate-ethylacrylate copolymer particles.

Near the completion of the polymerization reaction, the reaction mixture will comprise small copolymer particles suspended in water due to the nonionic and anionic surfactants. This latex may typically have a solids level of from 25 to 30 percent and thus it may be necessary to dilute it with water to achieve a more usable solids level for coating. Higher solids levels will result in agglomeration of the copolymer particles into larger particles or clumps of particles which will tend to precipitate from the emulsion as grit. The nonionic surfactant serves as a post-polymerization emulsion stabilizer.

The above described emulsion polymerization process is very similar to well known processes described in "Principles of Polymerization" by George Odian, second edition, published by John Wiley and Sons. In addition, similar processes are described in U.S. Pat. Nos. 5,096,784 and 5,114,739, which are incorporated in their entireties herein by reference.

According to yet another embodiment of the present invention, it has been determined that acetone-strippable release coatings are also provided from polyacrylic acid homopolymer coatings, particularly those coatings formed from a hydrophilic colloidal solution of polyacrylic acid homopolymer having a weight average molecular weight in the range of from about 40,000 to about 80,000 units. In some embodiments of the invention, release coatings are provided made of a polyacrylic acid homopolymer having a $T_g$ of greater than or equal to about 100° C., preferably between 100 and 110° C., which provide advantageously clear release coatings that are acetone strippable and do not substantially adversely affect reclaimability of a polyester film substrate. Polyacrylic acid homopolymers with lower $T_g$'s, for example, below about 60° C., tend to be more difficult to strip in acetone and tend to produce hazier overcoated metallized layers as compared to coatings made of higher $T_g$ polyacrylic acid homopolymers. Polyacrylic acid homopolymers having $T_g$'s of greater than 110° C. may be used so long as they are strippable in the stripping solvent.

One exemplary formulation according to embodiments of the invention is a substantially pure polyacrylic acid homopolymer having a weight average molecular weight of about 60,000 units, a $T_g$ of about 105° C. and which is provided in a clear, colorless, viscous stable, hydrophilic colloidal solution. A commercially available polyacrylic acid homopolymer exhibiting such characteristics is available as ACUMER 1510 from Rohm and Haas Company of Philadelphia, Penn. Release layers formed from such formulations are clear, acetone strippable, and reclaimable. Metallized films topcoated on such release layers exhibit excellent quality and predictability, and can be processed to achieve at least substantially consistent and uniform surface morphology and at least substantially uniformly flat optical flakes upon breaking-up. These qualities make the release coatings of the invention ideal for use in forming optically variable flakes and films.

While substantially pure homopolymeric polymers of 2-propenoic acid are preferred, substantially pure homopolymers containing up to about 20% of other monomers may also be used according to embodiments of the invention, provided the resulting polymer is strippable in at least one stripping solvent, preferably an organic solvent. In addition, substantially clear overcoated metallized layers should be capable of being formed on the acrylic acid copolymer coating. Preferably, the 2-propenoic acid homopolymer contains less than about 10% by weight other monomeric units, more preferably less than about 5% by weight, and even more preferably less than about 1% by weight other monomeric units. Exemplary of other strippable monomers which may be copolymerized with the acrylic acid monomer to provide strippable acrylic acid copolymers are ethylacrylate (EA), methylmethacrylate (MMA), and mixtures thereof. According to embodiments of the invention, only enough free radical initiator is incorporated into the homopolymer or copolymer to achieve a weight average molecular weight of 10,000 or more. When higher amounts of initiator are used, the resulting homopolymer or copolymer has a lower molecular weight, and the acetone strippability of the homopolymer or copolymer tends to be diminished. For example, homopolymers containing sufficient initiator to achieve a homopolymer molecular weight of less than about 10,000 are generally poorly strippable in acetone, if strippable at all.

According to embodiments of the invention wherein the release coating comprises a polyacrylic acid homopolymer, a hydrophilic coating solution of the homopolymer is preferably employed and may be applied to the substrate and dried to form the release coating.

The coatings of the present invention may be applied to the base film as an aqueous dispersion having a solids concentration within the range of from about 0.5% by weight to about 30% by weight, more preferably from about 5% by weight to about 20% by weight. The preferred solids level is such as to yield a desired final dry coating weight. For polyacrylic acid homopolymer coatings, a desired coating weight may be from about 25 dry mg/m² to about 1000 dry mg/m², preferably from about 25 to about 225 dry mg/m², for example, from about 80 to about 130 dry mg/m². Generally, however, the coating weight should be as thin as possible for economical reasons. According to embodiments of the invention, strippable coatings of MMA/EA copolymers having $T_g$'s of from about 29° C. to less than 60° C. may be formed at coating weights of as low as about 40 dry mg/m². For copolymers having $T_g$'s of less than 60° C., a preferred maximum coating weight of about 225 dry mg/m² may be used, for example a coating weight range of from about 50 dry mg/m² to about 200 dry mg/m². For coatings made from MMA/EA copolymers having $T_g$'s of from about 60° C. to about 69° C., coating weights of as low as 25 dry mg/m² can be used. For copolymers having $T_g$'s of from about 60° C. to about 69° C., a preferred maximum coating weight of about 200 dry mg/m$^2$ may be used, with a coating range of from about 29 dry mg/m$^2$ to about 100 dry mg/m$^2$ being preferred. According to embodiments of the invention, strippable coatings of MMA/EA copolymers having $T_g$'s of about 70° C. or higher may be formed at coating weights of as low as about 25 dry mg/m$^2$, and a preferred maximum coating weight of about 250 dry mg/m$^2$ may be used, with a dry coating weight range of from about 40 dry mg/m$^2$ to about 100 dry mg/m$^2$ being preferred. For some MMA/EA copolymers, even lower coating weights can be employed provided the coating is sufficiently strippable in an appropriate stripping solvent so as to release an overcoated metallized layer.

For MMA/EA copolymer compositions having $T_g$'s of from about 29° C. to about 70° C., coating weights of from about 40 to about 100 dry mg/m$^2$ are preferred, with coating weights of from about 58 to about 64 dry mg/m$^2$ being particularly preferred. The release coating should not be too thin as to: (1) permit penetration by an overlayer and bonding of the overlayer to the underlying substrate, or (2) significantly limit the edge surface area of the release coating which is exposed to solvent attack. The thickness of the release coating may pose problems with the quick and complete dissolution of the release coating when contacted with the stripping solvent and may be limited by economic factors. Excessively thick coatings, for example, resulting in dry coating weights greater than about 1000 mg/m$^2$, may cause haziness in overcoated metal layers and should be avoided for applications wherein extremely clear metallized layers and flakes are desired.

According to some embodiments of the invention, the coating weight is from about 40 to 200 dry mg/m$^2$, regardless of whether the polymer is a polyacrylic acid homo- or copolymer or a MMA/EA copolymer.

In applications where the release layer is formed from an aqueous emulsion, the coalescing of the release coating polymer during coating formation may result in the formation of polymer particles or agglomerations which are large enough to materially affect clarity of an overcoated metallized layer. According to an embodiment of the invention, a release coating polymer emulsion is provided having a solids content in the range of from about 6% by weight to about 25% by weight, with a range in the amount of from about 7% by weight to about 12% by weight being more preferred for some applications. When MMA/EA copolymers are used as release coating formulations, it is preferable to provide a solution or emulsion of the coating formulation having a solids percent of the copolymer ranging from about 7% by weight to about 25% by weight based on the total weight of the solution or emulsion. For MMA/EA copolymers having $T_g$'s of less than 60° C., coating emulsions having solids contents of about 10% by weight or more are preferred, for example, from about 10% by weight to about 20% by weight. Higher solids contents may result in coating emulsions that are too viscous and cause film defects in the resulting release coating.

According to embodiments of the invention, the solution or emulsion may be coated on a drawn PET film substrate which has been uniaxially stretched in the machine or longitudinal direction. The solution may be applied to the substrate at a wet laydown of from about 0.4 to about 1.6 wet lb./1000 ft$^2$ of forward drawn sheet. The coated substrate may then be dried and stretched widthwise in the transverse direction to about 3.5 to about 4.0 times the width it had before transverse stretching, for example, about 3.7 times. Based on the solids content range and the wet laydown range, dry coating weights on the biaxially stretched film of from about 63.4 dry mg/m$^2$ to about 253.6 dry mg/m$^2$ may be achieved.

After applying the coating solution or emulsion, the release coating should be at least substantially or completely dried prior to metal deposition thereon. If the release coating is not sufficiently dried, problems may occur in connection with the degassing of residual volatiles. Such problems include the formation of blemishes on a subsequently formed metallized or optically variable overlayer. Generally, the moisture content of the dried release coating may be less than about 5% by weight, preferably less than about 3% by weight, and more preferably less than about 1% by weight.

If additives are included in the polymeric release coating formulations of the invention, the additives may be selected from effective amounts of film filming agents. If employed, film-forming agents may be added in amounts of from about 0.1% to about 10% by weight, for example, an amount of from about 3% by weight to about 5% by weight based upon the dry weight of the strippable coating.

The coating solutions and emulsions used in accordance with the present invention may have extremely minor proportions (less than about 5% by weight) of incorporated emulsifying agents. Even at levels of less than about 5% by weight, such agents may overcome the problems associated with emulsion coating techniques including the undesired formation of macroscopic holes and the undesired production of a porous structure.

Emulsifiers may also be used to improve the homogeneity of the coating emulsion. Amounts effective to improve the consistency of the coating emulsion are preferred, if an emulsifier is used at all. If an emulsifier is used, it should be selected so as to not detrimentally affect the optical properties of an overcoated metallized layer. Exemplary of emulsifiers which may be used are anionic surfactants including sodium lauryl sulfate and sodium dodecylbenzene sulfonate.

According to embodiments of the invention wherein the release coating formulation is applied in the form of an aqueous emulsion, it is preferable to add a coalescing agent to the formulation to aid in film formation. Coalescing agents such as glycerine, polyethylene glycol (PEG), ethylene glycol (EG) diethylene glycol (DEG), triethylene glycol (TEG) may be included in the release coating formulation in amounts effective to improve film formation of the release coating.

The incorporation of only a minimum amount of coalescing agents is preferred, however, because due to their high boiling points, coalescing agents may not become volatilized with the aqueous portion of the coating emulsion, and instead attach to and remain on a resultant overlayer and flakes produced from such overlayer. When a coalescing agent is not incorporated, emulsion coating problems may arise such as the formation of holes or voids in the resultant coating and the corresponding formation of a porous structure. However, because coalescing agents tend to degas under the heat of a vacuum metallization process, the use of such agents is preferably avoided as degassing causes blemishes and distortion of a metallized vacuum deposited layer. Thus, if it is necessary to use a film forming or coalescing agent, it is preferably used at the minimum amount needed for the agent to be effective.

Another additive which may be used in the polymer solutions and emulsions for the release coating of the invention is an antiblocking or slip agent. Finely divided silica, for example, may be incorporated into the release coating in amounts effective to reduce friction between the release coating and the substrate. Exemplary particle sizes for the slip agent may range from about 4 millimicrons to about 80 millimicrons. One preferred slip agent for incorporation into the release coating is NALCO 1060, a finely divided silica having an average particle size of about 60 millimicrons, available from Nalco Chemical Company, Chicago, Ill. Amounts of slip agent in the range of from about 0.1% to about 1.0% by weight are preferred, particularly if the agent is a finely divided silica. More preferably, a slip agent is instead incorporated into the underlying substrate, as, for example, when a filled PET film is used as the substrate. Exemplary slip agents, fillers, and filled PET films are disclosed, for example, in U.S. Pat. No. 3,821,156 to Farrar and U.S. Pat. No. 3,884,870 to Dodson et al., which are both incorporated herein in their entireties.

A substrate coated with a release coating of the present invention may be subsequently coated with a metallized layer, which is formed on the release coating. The metallized layer may be formed by a vacuum deposition or other technique. The metallized layer is separated from the release coated substrate upon partial or complete dissolution of the release coating material with an appropriate stripping solvent. When the release coating is contacted with the stripping solvent, the release layer is dissolved and the metallized layer formed thereon is released. According to an embodiment of the invention, the metallized layer breaks-up as the release coating is removed from the substrate. The resulting flakes can then be collected, treated to obtain a desired size, and used in optically variable inks, paints, pigments, coatings and devices.

The release coating may be formed by spray coating, pouring and doctoring with a meyer rod, gravure coating, or otherwise coating the substrate.

According to a preferred embodiment of the invention, the supporting substrate comprises a flexible web. Preferred materials for the substrate include flexible thin films, sheets and webs. Thin films, sheets, webs and structures of polymeric material, such as polyester, are preferred. A preferred substrate material is polyethylene terephthalate (PET), preferably in the form of a thin film. The substrate can be a drawn film which is coated by an in-line process, or coated off-line. PET films having thicknesses after stretching of from about 40 to about 400 gauge are preferred according to some embodiments of the invention, with thickness of between about 140 and about 300 gauge being more preferred for some embodiments and 200 gauge films being even more preferred for some embodiments. Exemplary PET films for off-line coating which are well suited for the supporting substrate include filled PET films and unfilled PET films. The substrate material may or may not be soluble in the solvent used to dissolve or strip the release coating. According to preferred embodiments, the substrate may be reclaimable.

The polymer of the release layer must be dissolvable or strippable in at least one solvent. Because of its low boiling point, high volatility, relative safety, commercial availability, effectiveness and low cost, acetone is a preferred solvent. Other organic and aqueous solvents may also be used as the stripping solvent for the release layer. Polyacrylic acid homopolymers used according to embodiments of the present invention are preferably soluble in acetone, and release layers comprising such polymers are acceptably stripped or dissolved from a substrate with a single pass through acetone. Other possible stripping solvents which may be used include methanol, ethanol, isopropanol, acetone, methyl ethyl ketone, ethyl acetate, methylene chloride, alcohol-water mixtures, 2-amino-2-methyl-1-propanol, and mixtures thereof.

When acetone is used to strip the release coatings of the present invention, it has been found to consistently provide at least substantial stripping of the release coatings of the present invention. Little or no polymer remains on the separated layer or flakes after dissolution of the release coating. Accordingly, the present methods which use acetone to strip the release layer are superior to methods wherein a polymeric release layer is not completely removed from an overlayer or flakes. Such other methods require an additional wash with solvent to cleanse residual polymer therefrom, a problem obviated by the present invention. Surprisingly, when other polymeric release coating materials are subjected to acetone, complete release layer stripping has been difficult, if not impossible, to achieve while at the same time not substantially adversely affecting the quality and metallized foil appearance of an overcoated metallized layer.

According to yet another preferred embodiment of the invention, the release coating may be in-line coated onto the substrate. Off-line coating methods may also be used, but a major advantage of the present invention is the ability to in-line coat the release coating formulation. If an in-line coating process is used, the substrate can be drawn as, for example, a polyethylene terephthalate film, and coated while in-line with a release coating solution. Such an in-line process eliminates costly down time associated with the loading and unloading, winding and unwinding of a PET film roll as is needed when the release coating is produced off-line.

In-line coating processes which may be used include processes wherein the polymeric substrate is biaxially or uniaxially stretched to be oriented. Any of many well known orientation techniques can be used to stretch the substrate. According to a preferred embodiment of the invention, the substrate is stretched in a first direction, then the release coating is formed on the stretched substrate and dried, then the coated substrate is stretched in a direction perpendicular to the first stretching direction. Such a method is referred to herein as an interdraw coating method. Alternatively, the substrate may be biaxially oriented before the release coating is formed thereon, or the substrate may first be coated with the release coating and then the coated substrate is uniaxially or biaxially oriented. After stretching, the substrate may be further heat treated to lock-in its resulting physical properties.

According to a preferred embodiment of the invention, a release coating solution is in-line coated onto a surface of a slip agent filled PET film. Prior to being coated, the PET film may be extruded and drawn during the same in-line process, uniaxially stretched in the machine or longitudinal direction, and corona discharge treated. The release coating solution may then be applied to the uniaxially stretched, corona treated film.

After the release coating is applied to the uniaxially stretched and corona treated film, the coated film may then be stretched in the transverse direction. Stretch ratios of from about 3.5:1 to about 4:1 are preferred for PET substrate films having uniaxially stretched film thicknesses of from about 160 to about 1600 gauge prior to transverse stretching. Biaxially stretched film substrates having a thickness of from about 40 to about 400 gauge are preferred, with thicknesses of from about 140 to about 200 gauge being more preferred. Films having thicknesses of below about 40 gauge are generally too flimsy and weak to be used as supporting substrates whereas the thickness of a substrate film is limited by cost considerations and flexibility requirements.

Before coating the surface of the in-line produced, uniaxially oriented film, the surface may preferably be corona discharge treated to improve wet-out properties of the release coating solution. A corona treated surface provides for a uniformly thick and continuous coating on the surface of the PET substrate film. Corona treatments of from about 2 watts per square foot per minute to about 8 watts per square foot per minute ($W/ft^2/min$) are preferred with treatments of about 3–5 $W/ft^2/min$ being more preferred.

According to a further aspect of the present invention, an overlayer is formed on the release coated substrate and is removed when the release layer is stripped off or dissolved from the substrate. Exemplary of preferred overlayer materials which may be employed are optically variable coating materials such as multiple layered optically variable structures and devices. In one particular application of the present invention, the substrate with release coating thereon is coated with a vacuum deposited metallized layer. Such metallized layers and multilayered structures are disclosed, for example, in U.S. Pat. Nos. 4,930,866 to Berning, et al.; 5,059,454 to Todd, et al.; and 5,084,351 to Philips, et al., which are hereby incorporated in their entireties by reference. Particular metallized layers which may be formed on the release coatings of the present invention include silicon oxide containing layers and other metal oxide containing layers. One suitable method for forming a metallized layer on the release coating is the vacuum or vapor deposition of a metallized layer in a bell jar metallizer. Other techniques may also be used to form a metallized overlayer and include various sputtering techniques.

The layer to be released from the release coated substrate may be removed in the form of flakes, which are used in optically variable inks, pigments, paints and devices. Methods of forming flakes for such purposes are taught, for example, in U.S. Pat. Nos. 4,434,010 to Ash; 5,059,454 to Todd, et al.; and 5,383,995 to Phillips, et al., which are hereby incorporated in their entireties by reference. Examples of the metal overlayers include dielectric stacks comprising alternate layers of low refractive index materials and high refractive index materials for a total of, for example, up to nine layers. A variety of low and high index materials known in the art can be used for such an optical multilayer. Exemplary combinations are zinc sulfide with magnesium fluoride and titanium dioxide with silicon dioxide. A variety of other dielectric materials could also be used, such as germanium, silicon, indium oxide and silicon monoxide. When metallized layers such as those disclosed in the latter three patents are formed on the release coating, the layers break-up as the release coating is removed from the substrate, as disclosed in U.S. Pat. No. 5,059,245 to Phillips et al. As the layer breaks-up, more complete attack of the release coating is achieved as compared to the attack of a release coating overcoated with an unbroken purely aluminum metallized layer.

While contacting the release coating with the stripping solvent can be achieved by a variety of methods, continuously passing the coated substrate through a pan of the stripping solvent is a preferred method. Dipping techniques can also be used to strip the release coat. As the stripping solvent attacks the release coating polymer, the polymer swells as it dissolves, loosening the overlayer and facilitating removal of the overlayer from the coated substrate.

Methods according to embodiments of the invention may further comprise contacting, adhering, or transferring the release coating with a layer formed thereon to a second substrate, and then contacting the release coating with the solvent to remove the original, or first substrate, resulting in the application of the entire layer to the second substrate. Such methods are described in more detail with respect to forming replicated coatings in U.S. Pat. No. 4,434,010 to Ash. The methods disclosed include putting an amount of adhesive on a surface of an article, laying a coated substrate according to the invention on the surface with the optical coating in contact with the adhesive, using a plate to press the coated substrate against the adhesive to spread the adhesive into a uniform thin layer, curing the adhesive, and separating the optical coating from the substrate by immersing the article in a stripping solvent or flushing the coated surface of the article with a stripping solvent.

One major advantage of the present invention is that the polymeric release coating of the invention does not substantially adversely affect reclaimability of a polyester film substrate when coated on such a substrate.

The present invention is further illustrated by the following non-limiting examples wherein all parts, percentages and ratios are by weight, and all temperatures are in ° C. unless otherwise indicated:

EXAMPLES 1–2 and COMPARATIVE EXAMPLES 1–4

Aqueous coating formulations were prepared at 5%, 10% and 20% by weight solids content from Rohm and Haas ACUMER 1510 and ACUMER 1020 polymer materials. A comparison of infrared analyses of the ACUMER 1510 polyacrylic acid homopolymer and the ACUMER 1020 formulation indicates that the ACUMER 1020 formulation is not the same polyacrylic acid homopolymer as the ACUMER 1510 homopolymer and is believed to contain a sufficient amount of free radical initiator to materially alter the molecular weight and acetone strippability of the homopolymer. The comparative infrared analyses involved smearing a sample of each ACUMER formulation on a respective AgCl cell, drying the samples, and infrared scanning each sample from 4000 $cm^{-1}$ to 400 $cm^{-1}$. The resultant data revealed that ACUMER 1020 has a strong absorption band at approximately 1130 $cm^{-1}$, whereas the ACUMER 1510 polyacrylic acid homopolymer has a band at 1030 $cm^{-1}$. Other differences between the two spectra include two strong carbonyl bands, not of equal intensity, in the region from approximately 1800 $cm^{-1}$ to 1750 $cm^{-1}$ for the ACUMER 1510 homopolymer; whereas the ACUMER 1020 sample had only one strong carbonyl band, which occurred at approximately 1730 $cm^{-1}$. The ACUMER 1510 coating formulation was a clear hydrophilic solution of the polyacrylic acid homopolymer. The ACUMER 1020 formulation was cloudy, and is believed to be an aqueous emulsion of a proprietary polyacrylic acid polymer or polymer mixture. Both ACUMER materials had a $T_g$ of 105° C. The coating formulations were in-line coated with a gravure cylinder onto freshly in-line drawn, slip agent-filled, machine-direction oriented, and corona treated polyethylene terephthalate film substrates. Corona treatment of each machine-direction oriented substrate involved a treatment of about 3 watts per square foot per minute on the surface to which the coating formulation was to be applied. Each uniaxially-stretched substrate had a thickness of about 800 gauge. After application of the release coating, each coated substrate was then in-line heated in a preheat zone to about 100° C. and pulled through an in-line tenter device wherein the coated, uniaxially-stretched PET substrate was transversely stretched width-wise to about four times its original width, thus forming a biaxially oriented substrate having a thickness of about 200 gauge. After preheating and tentering, the coating formulation was dry, or if not, was allowed to dry. The method resulted in coating weights of from about 49.3 mg/m² to about 214.4 dry mg/m² on the biaxially stretched film substrate.

The coating formulations were allowed to completely dry to prevent and minimize degassing of volatiles upon vacuum metallization to form an overlayer. Then, a vacuum deposited aluminum metallized layer was applied on top of each experimental coating in a bell jar metallizer apparatus. The deposited aluminum layer for each sample had a thickness of from about 400 angstroms to about 600 angstroms. After cooling to room temperature, the aluminum coated substrate was dipped in room temperature acetone for a time period of from about 10 seconds to about 60 seconds to determine acetone strippability of the coating. While in the acetone dip, the metallized, release-coated substrate was agitated but no scrubbing or scraping of the metal foil was employed.

added proportionally to the same formulas used in Examples 1–2 and Comparatives 1–4, to form new Comparatives 5–10, respectively. FLUORAD FC-170C is a nonionic fluorosurfactant which is about 80% active and contains about 70% by weight fluoroaliphatic oxyethylene adduct of the formula:

$$R_fSO_2N(C_2H_5)(CH_2CH_2O)_xH$$

wherein x is proprietary, $R_f$ is $C_nF_{2n+1}$ and n is about 8. FLUORAD FC-170C also contains about 12% by weight polyoxyethylene glycol, about 7% by weight water, and minor amounts of 1,4 dioxane and $C_4$ to $C_7$ fluoroaliphatic adducts.

As in Examples 1–2 and Comparative Examples 1–4 reported in Table II, the coating formulations of Comparative Examples 5–10 were in-line coated with a gravure

TABLE II

| EXAMPLE | COATING FORMULATION SOLIDS CONTENT | COATING WEIGHT (dry mg/m²) | M.W. | $T_g$ °C. | ACETONE REMOVAL | METAL FOIL APPEARANCE |
|---|---|---|---|---|---|---|
| EXAMPLE 1 | 10% Acumer 1510 | 86.6 | 60,000 | 105 | partial | clear |
| EXAMPLE 2 | 20% Acumer 1510 | 214.4 | 60,000 | 105 | slight | hazy |
| COMPARATIVE 1 | 5% Acumer 1510 | 53.3 | 60,000 | 105 | none | slightly hazy |
| COMPARATIVE 2 | 5% Acumer 1020 | 49.3 | 2000 | 105 | none | hazy |
| COMPARATIVE 3 | 10% Acumer 1020 | 102.6 | 2000 | 105 | none | hazy |
| COMPARATIVE 4 | 20% Acumer 1020 | 206.5 | 2000 | 105 | none | hazy |

Subjective observation was used to evaluate acetone removal on a scale ranging from none, to very slight, to slight, to partial, to complete. As can be seen in Table II, the coatings comprising the ACUMER 1510 formulations at coating weights of 86.6 mg/m² and 214.4 mg/m² (Examples 1 and 2) were partially and slightly strippable, respectively, after being coated with a vacuum deposited aluminum layer. Acceptable acetone strippability for use in making optically variable layers and flakes according to the invention includes ratings of "slight" strippability. "Slight" strippability is considered acceptable because the overcoated aluminum layer does not break-up as the release coating is removed and is much harder to release than an overcoated optically variable metallized layer material which does break-up when the release coating is removed. Thus, if a test coating is slightly released despite having an aluminum overcoat vacuum deposited thereon, it is expected that substantial release would result if overcoated with an optically variable metallized layer which breaks-up.

Surprisingly, the lower molecular weight polyacrylic acid polymer, ACUMER 1020, (Comparative Examples 2–4) did not strip when applied at any of the three solids coating weights. Despite having a much higher molecular weight, the ACUMER 1510 did acceptably strip when formed from liquid solutions having solids contents of 10% by weight and 20% by weight solids, with coating weights of 86.6 mg/m² and 214.4 mg/m², respectively. The acetone strippability of the coatings of Examples 1 and 2 is believed to be attributable to the homopolymer composition of the coating formulation and the coating weights in the range of from about 60 mg/m² to about 225 mg/m².

COMPARIATIVE EXAMPLES 5–10

Next, the effect of adding a minor amount of a fluorosurfactant to the release coating composition was tested. Various levels of the fluorosurfactant FLUORAD FC-170C (available from the 3M Company, St. Paul, Minn.) were cylinder onto freshly in-line drawn, slip agent-filled, machine-direction oriented, and corona treated polyethylene terephthalate film substrates. Corona treatment of each machine-direction oriented substrate involved a treatment of about 3 watts per square foot per minute on the surface to which the coating formulation was to be applied. Each uniaxially-stretched substrate had a thickness of about 800 gauge. After application of the release coating, each coated substrate was then in-line heated in a preheat zone to about 100° C. and pulled through an in-line tenter device wherein the coated, uniaxially-stretched PET substrate was transversely stretched width-wise to about four times its original width, thus forming a biaxially oriented substrate having a thickness of about 200 gauge. After preheating and tentering, the coating formulation was dry, or if not, was allowed to dry. The method resulted in coating weights of from about 46.6 mg/m² to about 198.5 dry mg/m² on the biaxially stretched film substrate.

The coating formulations were allowed to completely dry to prevent and-minimize degassing of volatiles upon vacuum metallization to form an overlayer. Then, a vacuum deposited aluminum metallized layer was applied on top of each experimental coating in a bell jar metallizer apparatus. After cooling to room temperature, the aluminum coated substrate was dipped in room temperature acetone for a time period of from about 10 seconds to about 60 seconds to determine acetone strippability of the coating. While in the acetone dip, the metallized, release-coated substrate was agitated but no scrubbing or scraping of the metal foil was employed.

The acetone removal of the release coatings of Comparative Examples 5–10 are reported in Table III:

TABLE III

| EXAMPLE | COATING FORMULATION SOLIDS CONTENT | COATING WEIGHT (dry mg/m²) | M.W. | $T_g$ ° C. | ACETONE REMOVAL | METAL FOIL APPEARANCE |
|---|---|---|---|---|---|---|
| COMPARATIVE 5 | 5% Acumer 1510 + 0.035% FC-170C | 46.6 | 60,000 | 105 | none | slightly hazy |
| COMPARATIVE 6 | 10% Acumer 1510 + 0.07% FC-170C | 90.6 | 60,000 | 105 | none | slightly hazy |
| COMPARATIVE 7 | 20% Acumer 1510 + 0.14% FC-170C | 154.5 | 60,000 | 105 | none | hazy |
| COMPARATIVE 8 | 5% Acumer 1020 + 0.035% FC-170C | 51.9 | 2000 | 105 | none | hazy |
| COMPARATIVE 9 | 10% Acumer 1020 + 0.07% FC-170C | 102.6 | 2000 | 105 | none | hazy |
| COMPARATIVE 10 | 20% Acumer 1020 + 0.14% FC-170C | 198.5 | 2000 | 105 | none | hazy |

Rather than improving the strippability of the coating formulations, it was unexpectedly found that additions of minor amounts of the fluorosurfactant caused a drastic resistance to acetone removal in all formulations, even in the previously strippable formulations. Thus, the results shown in Table III indicate that fluorosurfactants should be avoided in the release coating formulations according to embodiments of the present invention.

EXAMPLES 3–12 and COMPARATIVE EXAMPLES 11–12

Various coating formulations were prepared from emulsions of various copolymers of methylmethacrylate and ethylacrylate. In each emulsion, nonionic and anionic surfactants were included. The nonionic surfactant was Triton X-405, a member of the chemical family of alkylaryl polyether alcohols, available from Union Carbide, Danbury, Connecticut. Each emulsion contained about 22% by weight dry Triton X-405 surfactant based on the dry copolymer solids weight in the emulsion. The anionic surfactant was sodium lauryl sulfate, present in an amount of about 2.6% by weight dry sodium lauryl sulfate surfactant based on the dry copolymer solids weight in the emulsion. As in Examples 1–2 and Comparative Examples 1–10, the formulations of Examples 3–12 and Comparative Examples 11–12 were in-line coated with a gravure cylinder onto freshly in-line drawn, slip agent-filled, machine-direction oriented, and corona treated polyethylene terephthalate film substrates. Corona treatment of each machine-direction oriented substrate involved a treatment of about 3 watts per square foot per minute on the surface to which the coating formulation was to be applied. Each uniaxially-stretched substrate had a thickness of about 800 gauge. After application of the release coating, each coated substrate was then in-line heated in a preheat zone to about 100° C. and pulled through an in-line tenter device wherein the coated, uniaxially-stretched PET substrate was transversely stretched widthwise to about four times its original width, thus forming a biaxially oriented substrate having a thickness of about 200 gauge. After preheating and tentering, the coating formulation was dry, or if not, was allowed to dry. The method resulted in coating weights of from about 53.3 mg/m² to about 206.5 dry mg/m² on the biaxially stretched film substrate.

The coating formulations were allowed to completely dry to prevent and minimize degassing of volatiles upon vacuum metallization to form an overlayer. Then, a vacuum deposited aluminum metallized layer having a thickness of from about 400 angstroms to about 600 angstroms was deposited on top of each experimental coating in a bell jar metallizer apparatus. After cooling to room temperature, the aluminum coated substrate was dipped in room temperature acetone for a time period of from about 10 seconds to about 60 seconds to determine acetone strippability of the coating. While in the acetone dip, the metallized, release-coated substrate was agitated but no scrubbing or scraping of the metal foil was employed. Acetone removal of the coatings are shown in Table IV:

TABLE IV

| EXAMPLE | COATING FORMULATION (SOLIDS CONTENT) | COATING WEIGHT (dry mg/m²) | WEIGHT AVERAGE MOLECULAR WEIGHT (g/mol) | $T_g$ ° C. | ACETONE REMOVAL | METAL FOIL APPEARANCE |
|---|---|---|---|---|---|---|
| EXAMPLE 3 | 5% copolymer of 62.8% MMA and 37.2% EA | 55.9 | $10.7 \times 10^5$ | 45 | partial | slightly hazy |
| EXAMPLE 4 | 10% copolymer of 62.8% MMA and 37.2% EA | 106.6 | $10.7 \times 10^5$ | 45 | complete | hazy |
| EXAMPLE 5 | 20% copolymer of 62.8% MMA and 37.2% EA | 198.5 | $10.7 \times 10^5$ | 45 | partial | hazy |
| EXAMPLE 6 | 5% copolymer of 62.8% MMA and 37.2% EA | 53.6 | $1.55 \times 10^5$ | 45 | complete | clear |

TABLE IV-continued

| EXAMPLE | COATING FORMULATION (SOLIDS CONTENT) | COATING WEIGHT (dry mg/m$^2$) | WEIGHT AVERAGE MOLECULAR WEIGHT (g/mol) | $T_g$ ° C. | ACETONE REMOVAL | METAL FOIL APPEARANCE |
|---|---|---|---|---|---|---|
| EXAMPLE 7 | 10% copolymer of 62.8% MMA and 37.2% EA | 106.6 | 1.55 × 10$^5$ | 45 | partial | slightly hazy |
| EXAMPLE 8 | 20% copolymer of 62.8% MMA and 37.2% EA | 206.5 | 1.55 × 10$^5$ | 45 | complete | hazy |
| EXAMPLE 9 | 5% copolymer of 73.5% MMA and 26.5% EA | 53.3 | from 1.0 × 10$^5$ to 2.0 × 10$^5$ | 60 | partial | clear |
| EXAMPLE 10 | 10% copolymer of 73.5% MMA and 26.5% EA | 106.6 | FROM 1.0 × 10$^5$ TO 2.0 × 10$^5$ | 60 | slight | slightly hazy |
| EXAMPLE 11 | 20% copolymer of 73.5% MMA and 26.5% EA | 185.1 | FROM 1.0 × 10$^5$ TO 2.0 × 10$^5$ | 60 | partial | hazy |
| EXAMPLE 12 | 5% copolymer of 80% MMA and 20% EA | 54.6 | FROM 1.0 × 10$^5$ TO 2.0 × 10$^5$ | 70 | Partial | clear |
| COMPARATIVE 11 | 10% copolymer of 80% MMA and 20% EA | 113.2 | FROM 1.0 × 10$^5$ TO 2.0 × 10$^5$ | 70 | none | hazy |
| COMPARATIVE 12 | 20% copolymer of 80% MMA and 20% EA | 189.1 | FROM 1.0 × 10$^5$ TO 2.0 × 10$^5$ | 70 | none | hazy |

The Example 12 sample having a release coating dry coating weight of about 54.6 mg/m$^2$, enabled the formation of an overcoated aluminum metallized layer which had an excellent metallized foil appearance, and the release coating was acceptably stripped in acetone. The metallized foil appearance of the vacuum deposited aluminum layer of the Example 12 sample was superior to the metallized foil appearance of the aluminum layers deposited on the lower $T_g$ and higher coating weight release coatings of Examples 3–5, 7, 8 and 10–11. The foil appearances of the Example 6 and 9 samples, which, like Example 12, had coating weights between 50 and 55 dry mg/m$^2$, were also clear.

EXAMPLES 13–24 and COMPARATIVE EXAMPLES 13–27

Aqueous hydrophilic coating formulations were prepared from emulsions comprising copolymers of methylmethacrylate and ethyl-acrylate. The emulsions of each copolymer had weight percents copolymer solids of 2.5% by weight, 5% by weight and 10% by weight. Emulsions of copolymers made from methylmethacrylate to ethylacrylate weight ratios of 50:50 to 80:20 were applied to slip agent-filled polyethylene terephthalate film substrates and allowed to dry. Each of the copolymers is believed to have a weight average molecular weight of from about 1×10$^5$ g/mol to about 2×10$^5$ g/mol. In each emulsion, nonionic and anionic surfactants were included. The nonionic surfactant was Triton X-405, a member of the chemical family of alkylaryl polyether alcohols, available from Union Carbide, Danbury, Connecticut. Each emulsion contained about 22% by weight dry Triton X-405 surfactant based on the dry copolymer solids weight in the emulsion. The anionic surfactant was sodium lauryl sulfate, present in an amount of about 2.6% by weight dry sodium lauryl sulfate surfactant based on the dry copolymer solids weight in the emulsion.

As in the Examples and Comparative Examples reported above in Tables II, III and IV, the coating formulations of Examples 13–24 and Comparative Examples 13–27 were in-line coated with a gravure cylinder onto freshly in-line drawn, slip agent-filled, machine-direction oriented, and corona treated polyethylene terephthalate film substrates. Corona treatment of each machine-direction oriented substrate involved a treatment of about 3 watts per square foot per minute on the surface to which the coating formulation was to be applied. Each uniaxially-stretched substrate had a thickness of about 800 gauge. After application of the release coating, each coated substrate was then in-line heated in a preheat zone to about 100° C. and pulled through an in-line tenter device wherein the coated, uniaxially-stretched PET substrate was transversely stretched widthwise to about four times its original width, thus forming a biaxially oriented substrate having a thickness of about 200 gauge. After preheating and tentering, the coating formulation was dry, or if not, was allowed to dry. The method resulted in coating weights of from about 9.8 mg/m$^2$ to about 73.3 dry mg/m$^2$ on the biaxially stretched film substrate.

The coating formulations were allowed to completely dry to prevent and minimize degassing of volatiles upon vacuum metallization to form an overlayer. Then, a vacuum deposited aluminum metallized layer was applied on top of each experimental coating in a bell jar metallizer apparatus. The vacuum deposition resulted in a metallized layer thickness for each sample of from about 400 angstroms to about 600 angstroms. After cooling to room temperature, the aluminum coated substrate was dipped in room temperature acetone for a time period of from about 10 seconds to about 60 seconds to determine acetone strippability of the coating. While in the acetone dip, the metallized, release-coated substrate was agitated but no scrubbing or scraping of the metal foil was employed. The results of acetone strippability tests, or acetone removal tests, are reported in Table V below.

A subjective rating scale was also used to rank the metallized aluminum foil appearance of the overcoated layers formed on the coatings of Examples 13–24 and Comparative Examples 13–27. The ability of the release coating formulation to provide a clear metallized aluminum film is indicative of a preferred formulation for the production of overcoated optically variable films and flakes. Release coating formulations which provide for hazy overcoated metallized layers are useful in applications where the quality of the overcoated metallized film is not highly important. For producing high quality optically variable films and flakes, slightly hazy metallized films are preferred over hazy films but are not as preferred as clear films. Ratings of metallized foil appearance are reported in Table V below.

In Examples 22–24 shown in Table V below, coalescing agents were added at 0.5% by weight based on the total weight of the coating emulsion. For Example 22, the agent identified as LDS-10 is an anionic surfactant comprising sodium dodecylbenzene sulfonate, available as RHODACAL LDS-10 from Rhone-Poulenc, Inc., Cranbury, N.J. In Example 23, the agent identified as TEG is triethylene glycol.

TABLE V

| EXAMPLE | COATING FORMULATION | | COATING | | | METALLIZED |
|---|---|---|---|---|---|---|
| | COPOLYMER FORMULA | % BY WEIGHT SOLIDS IN EMULSION | WEIGHT (dry mg/m$^2$) | $T_g$ °C. | ACETONE REMOVAL | FOIL APPEARANCE |
| EXAMPLE 13 | 50% MMA and 50% EA | 10 | 68.4 | 29 | partial | hazy |
| EXAMPLE 14 | 56.4% MMA and 43.6% EA | 10 | 63.5 | 37 | partial | hazy |
| EXAMPLE 15 | 62.8% MMA and 37.2% EA | 10 | 58.6 | 45 | complete | slightly hazy |
| EXAMPLE 16 | 66% MMA and 34% EA | 10 | 63.5 | 50 | complete | hazy |
| EXAMPLE 17 | 69% MMA and 31% EA | 10 | 68.4 | 55 | partial | hazy |
| EXAMPLE 18 | 73.5% MMA and 26.5% EA | 5 | 29.3 | 60 | partial | clear |
| EXAMPLE 19 | 73.5% MMA and 26.5% EA | 10 | 63.5 | 60 | complete | clear |
| EXAMPLE 20 | 77% MMA and 23% EA | 10 | 58.6 | 65 | partial | clear |
| EXAMPLE 21 | 80% MMA and 20% EA | 10 | 53.8 | 70 | partial | clear |
| EXAMPLE 22 | 62.8% MMA and 37.2% EA plus 0.5% LDS-10 based on total MMA + EA | 10 | 73.3 | 45 | partial | hazy |
| EXAMPLE 23 | 62.8% MMA and 37.2% EA plus 0.5% TEG based on total MMA + EA | 10 | 73.3 | 45 | partial | hazy |
| EXAMPLE 24 | 62.8% MMA and 37.2% EA plus 0.5% Glycerin based on total MMA + EA | 10 | 48.9 | 45 | partial | hazy |
| COMPARATIVE 13 | 50% MMA and 50% EA | 2.5 | 14.7 | 29 | none | clear |
| COMPARATIVE 14 | 50% MMA and 50% EA | 5 | 29.3 | 29 | none | clear |
| COMPARATIVE 15 | 56.4% MMA and 43.6% EA | 2.5 | 14.7 | 37 | none | clear |
| COMPARATIVE 16 | 56.4% MMA and 43.6% EA | 5 | 29.3 | 37 | none | hazy |
| COMPARATIVE 17 | 62.8% MMA and 37.2% EA | 2.5 | 14.7 | 45 | none | clear |
| COMPARATIVE 18 | 62.8% MMA and 37.2% EA | 5 | 24.4 | 45 | none | clear |
| COMPARATIVE 19 | 66% MMA and 34% EA | 2.5 | 9.8 | 50 | none | clear |
| COMPARATIVE 20 | 66% MMA and 34% EA | 5 | 24.4 | 50 | none | clear |
| COMPARATIVE 21 | 69% MMA and 31% EA | 2.5 | 14.7 | 55 | none | clear |
| COMPARATIVE 22 | 69% MMA and 31% EA | 5 | 29.3 | 55 | none | clear |
| COMPARATIVE 23 | 73.5% MMA and 26.5% EA | 2.5 | 9.8 | 60 | none | clear |
| COMPARATIVE 24 | 77% MMA and 23% EA | 2.5 | 9.8 | 65 | none | clear |
| COMPARATIVE 25 | 77% MMA and 23% EA | 5 | 24.4 | 65 | very slight | clear |
| COMPARATIVE 26 | 80% MMA and 20% EA | 2.5 | 14.7 | 70 | none | clear |
| COMPARATIVE 27 | 80% MMA and 20% EA | 5 | 24.4 | 70 | none | clear |

As can be seen in Table V, none of the comparative coating formulations applied at coating weights of 9.8 mg/m² or 14.7 mg/m² exhibited any strippability in acetone. It is believed that at such low coating weights, coatings made from such emulsions are too thin to prevent bonding of a metallized overlayer directly to the underlying PET substrate. Furthermore, the acetone removal results reported in Table V also show that emulsions having coating weights of either 24.4 mg/m² or 29.3 mg/m² did not strip in acetone for those comparative formulations having $T_g$'s of less than 60° C. The coatings of Example 18 and Comparative Example 25, having coating weights of 29.3 mg/m² and 24.4 mg/m², respectively, and $T_g$'s of greater than or equal to 60° C., did exhibit a clear metallized foil appearance and at least very slight acetone strippability. The inventive example (Example 18) had acceptable "partial" acetone-strippability as compared to the comparative Example (Comparative Example 25) which had unacceptable acetone-strippability.

Table V also shows that all Examples comprising coating weights of at least about 48.9 mg/m² (Examples 13–17, 19 and 20–24) exhibited very good to excellent removal in acetone, at glass transition temperatures ranging from about 29° C. to about 70° C. The Example 21 sample, which is similar to the Example 12 sample reported in Table IV above, provided a vacuum deposited aluminum layer having an excellent metallized foil appearance.

The most complete acetone removal was observed in Examples 15, 16 and 19, each of which comprised an emulsion having a solids content of 10% by weight, coating weights of 58.6 mg/m², 63.5 mg/m² and 63.5 mg/m², respectively, and $T_g$'s of 45° C., 50° C. and 60° C., respectively. Very good acetone removal, that is, at least "partial" removal, was observed for each of the other 10% solids content emulsions (Examples 13, 14, 17 and 20–25) which had coating weights ranging from 48.9 mg/m² to 73.3 mg/m². Partial removal was also observed for the Example 18 formulation comprising a coating weight of 29.3 dry mg/m² for the MMA/EA copolymer having a $T_g$ of 60° C.

Examples 22–24 in Table V indicate that the addition of 0.5% by weight coalescing agent to a coating formulation comprising 10% solids and a $T_g$ of 45° C. adversely affected acetone removal compared to the removal obtained in Example 15, but nonetheless provided a strippable release coating formula. In Example 15, the coating emulsion comprised the same copolymer and solids content but had no coalescing agent. As can be seen from Table V, the addition of just 0.5% coalescing agent reduced acetone strippability from complete to partial, and increased haze of the metallized overlayer from a slightly hazy appearance to a hazy appearance.

Although the coating weights of the coatings in Examples 22–24 slightly varied relative to the coating weight in Example 15, changes in strippability and foil appearance are believed to be more attributable to the addition of the coalescing agents. Thus, coating formulations incorporating, a coalescing agent are less preferred for uses wherein it is desired to form a high quality overcoated metallized layer on the release coating.

From the foregoing results, it is apparent that solvent-strippable release coatings according to the present invention include formulations of MMA/EA copolymers having $T_g$'s of from 29° C. to 70° C. and coating weights of from about 40 dry mg/m² to about 225 dry mg/m² are acceptably acetone-strippable. Further, the foregoing results indicate that release coatings made from MMA/EA copolymers having $T_g$'s of about 60° C. or higher, are acceptably acetone-strippable when applied at coating weights of as low as 25 dry mg/m², and provide clear metallized aluminum foil layers when aluminum is vacuum deposited thereon. The foregoing results also indicate that coating formulations consisting essentially of MMA/EA copolymers having glass transition temperatures of about 60° C. or higher consistently provide clear aluminum metallized layers when coated thereon. Therefore the coating formulations would be expected to provide a consistently clear metal foil appearance when one or a plurality of metal or metal oxide layers are vacuum deposited on such release coatings.

COMPARATIVE EXAMPLES 28–29

The acetone-strippability of coatings according to the invention, and the foil appearance of metallized layers coated thereon, were compared to the same properties of coatings made from other acrylics and the foil appearance of metallized layers formed thereon. Coating formulations were made from a carboxylated acrylic polymer applied at a coating weight of 52.6 dry mg/m² (Comparative Example 28) and from a methylmeth-acrylate-methacrylic acid copolymer applied at a coating weight of 105.1 dry mg/m² (Comparative Example 29).

The coating formulations of Comparative Examples 28 and 29 were in-line coated with a gravure cylinder onto freshly in-line drawn, unfilled, machine-direction oriented, and corona treated polyethylene terephthalate film substrates. Corona treatment of each machine-direction oriented substrate involved a treatment of about 3 watts per square foot per minute on the surface to which the coating formulation was to be applied. Each uniaxially-stretched substrate had a thickness of about 1500 gauge. After application of the release coating, each coated substrate was then in-line heated in a preheat zone to about 100° C. and pulled through an in-line tenter device wherein the coated, uniaxially-stretched PET substrate was transversely stretched widthwise to about four times its original width, thus forming a biaxially oriented substrate having a thickness of about 380 gauge. After preheating and tentering, the coating formulation was dry, or if not, was allowed to dry. The method resulted in coating weights of about 52.6 mg/m² and about 105.1 dry mg/m², for Comparative Examples 28 and 29, respectively, on the biaxially stretched film substrate.

The coating formulations were allowed to completely dry to prevent and minimize degassing of volatiles upon vacuum metallization to form an overlayer. Then, a vacuum deposited aluminum metallized layer was applied on top of each experimental coating in a bell jar metallizer apparatus. The deposited metallized layer has an aluminum layer thickness of from about 400 angstroms to about 600 angstroms. After cooling to room temperature, the aluminum coated substrate was dipped in room temperature acetone for a time period of from about 10 seconds to about 60 seconds to determine acetone strippability of the coating. While in the acetone dip, the metallized, release-coated substrate was agitated, but no scrubbing or scraping of the metal foil was employed.

The results of acetone-strippability tests and subjective ratings of the metallized layer appearance are reported in Table VI:

TABLE VI

| EXAMPLE | COATING FORMULATION | | COATING | | METALLIZED |
|---|---|---|---|---|---|
| | POLYMER MATERIAL | % BY WEIGHT SOLIDS IN EMULSION | WEIGHT (dry mg/m$^2$) | $T_g$ °C. | ACETONE REMOVAL | FOIL APPEARANCE |
| COMPARATIVE 28 | GLASCOL RP-5 (carboxylated acrylic) | 5 | 52.6 | 105 | none | hazy |
| COMPARATIVE 29 | SURCOL 441 (methylmethacrylate-methacrylic acid copolymer) | 10 | 105.1 | 125 | none | very hazy |

As can be seen in Table VI, neither of the coating formulations of Comparative Examples 28 and 29 exhibited any strippability in acetone, nor did they enable the formation of a vacuum deposited aluminum metallized layer thereon that has a clear appearance. The results from Comparative Examples 28 and 29 indicate that the acetone-strippability and clear metallized foil appearance achieved according to Examples 3–24 of the present invention are unexpected and surprising.

EXAMPLES 25–32

The effect of copolymer molecular weight was tested by comparing samples of MMA/EA copolymers of higher molecular weights with MMA/EA copolymers of the same monomeric component ratio and $T_g$ but of much lower molecular weight. The coating formulations of Examples 25–32 were in-line coated with a gravure cylinder onto freshly in-line drawn, slip agent-filled, machine-direction-oriented, and corona treated polyethylene terephthalate film substrates. Corona treatment of each machine-direction oriented substrate involved a treatment of about 3 watts per square foot per minute on the surface to which the coating formulation was to be applied. Each uniaxially-stretched substrate had a thickness of about 1500 gauge. After application of the release coating, each coated substrate was then in-line heated in a preheat zone to about 100° C. and pulled through an in-line tenter device wherein the coated, uniaxially-stretched PET substrate was transversely stretched width-wise to about four times its original width, thus forming a biaxially oriented substrate having a thickness of about 380 gauge. After preheating and tentering, the coating formulation was dry, or if not, was allowed to dry. The method resulted in release coatings having coating weights on the biaxially stretched film substrates as reported in Table VII below.

The coating formulations were allowed to completely dry to prevent and minimize degassing of volatiles upon vacuum metallization to form an overlayer. Then, a vacuum deposited aluminum metallized layer was applied on top of each experimental coating in a bell jar metallizer apparatus. The deposited metallized layer has an aluminum layer thickness of from about 400 angstroms to about 600 angstroms. After cooling to room temperature, the aluminum coated substrate was dipped in room temperature acetone for a time period of from about 10 seconds to about 60 seconds to determine acetone strippability of the coating. While in the acetone dip, the metallized, release-coated substrate was agitated, but no scrubbing or scraping of the metal foil was employed.

Table VII below shows the compositional ratios, $T_g$'s, molecular weights, and acetone removal of various MMA/EA copolymer coating formulations subjected to acetone removal testing:

TABLE VII

| EXAMPLE | COATING FORMULATION | | COATING | | | METALLIZED | |
|---|---|---|---|---|---|---|---|
| | POLYMER MATERIAL | % BY WEIGHT SOLIDS IN AQUEOUS EMULSION | WEIGHT (dry mg/m$^2$) | M.W. | $T_g$ °C. | ACETONE REMOVAL | FOIL APPEARANCE |
| EXAMPLE 25 | Copolymer of 62.8% by weight MMA 37.2% by weight EA | 10 | 62.9 | $10.7 \times 10^5$ | 45 | slight | clear |
| EXAMPLE 26 | Copolymer of 62.8% by weight MMA 37.2% by weight EA | 20 | 139.7 | $10.7 \times 10^5$ | 45 | complete | hazy |
| EXAMPLE 27 | Copolymer of 62.8% by weight MMA 37.2% by weight EA | 10 | 62.9 | $1.55 \times 10^5$ | 45 | complete | slightly hazy |
| EXAMPLE 28 | Copolymer of 62.8% by weight MMA 37.2% by weight EA | 20 | 139.7 | $1.55 \times 10^5$ | 45 | complete | hazy |
| EXAMPLE 29 | Copolymer of 50% by weight MMA 50% by weight EA | 10 | 62.9 | $11.8 \times 10^5$ | 29 | very slight | slightly hazy |
| EXAMPLE 30 | Copolymer of 50% by weight MMA 50% by weight EA | 20 | 146.9 | $11.8 \times 10^5$ | 29 | partial | hazy |
| EXAMPLE 31 | Copolymer of 50% by weight MMA 50% by weight EA | 10 | 59.4 | $1.37 \times 10^5$ | 29 | partial | slightly hazy |

TABLE VII-continued

| | COATING FORMULATION | | COATING | | | | METALLIZED |
|---|---|---|---|---|---|---|---|
| EXAMPLE | POLYMER MATERIAL | % BY WEIGHT SOLIDS IN AQUEOUS EMULSION | WEIGHT (dry mg/m$^2$) | M.W. | $T_g$ ° C. | ACETONE REMOVAL | FOIL APPEARANCE |
| EXAMPLE 32 | Copolymer of 50% by weight MMA 50% by weight EA | 20 | 160.9 | $1.37 \times 10^5$ | 29 | partial | hazy |

As can be seen in Table VI, the coating formulations of Examples 25 and 27 each comprised a copolymer of 62.8% by weight MMA and 37.2% by weight EA, and each polymer has a glass transition temperature of 45° C. The molecular weight of the Example 25 polymer was about 6.9 times greater than the molecular weight of the Example 27 polymer. The low molecular weight, metal-coated release layer polymer of Example 27 was completely removed from the PET substrate after acetone dipping. However, the higher molecular weight, metal-coated release layer polymer of Example 25 was only slightly removed after acetone dipping, despite having been applied at the same dry coating weight as the Example 27 coating. Because of the better acetone strippability and similar metal foil appearance, the lower molecular weight release coating formulation of Example 27 is preferred over the higher molecular weight coating formulation of Example 25. While the Example 26 and Example 28 coatings were each completely stripped, each coating had a much higher coating weight and thus required more coating polymer than the Example 25 and Example 27 coatings. In addition, metallized layers formed on the heavier weight coatings of Examples 26 and 28 had hazy appearances, whereas metallized layers formed on the lighter weight coatings of Examples 25 and 27 had clear and only slightly hazy appearances, respectively.

The coating formulations of Examples 29 and 31 each comprised a copolymer of 50% by weight MMA and 50% by weight EA, and each polymer has a glass transition temperature of 29° C. The molecular weight of the Example 31 polymer was about 8.6 times greater than the molecular weight of the Example 29 polymer. The low molecular weight, metal-coated release layer polymer of Example 31 was partially removed from the PET substrate after acetone dipping. However, the higher molecular weight, metal-coated release layer polymer of Example 29 was only very slightly removed after acetone dipping, despite having been applied at substantially the same dry coating weight as the Example 31 coating. Because of the better acetone strippability and similar metal foil appearance, the lower molecular weight release coating formulation of Example 31 is preferred over the higher molecular weight coating formulation of Example 29. While the Example 30 and Example 32 coatings were each partially stripped, both had a much higher coating weight and thus required more coating polymer than the Example 29 and Example 31 coatings. In addition, metallized layers formed on the heavier weight coatings of Examples 30 and 32 had hazier, and thus less desirable, appearances than metallized layers formed on the lighter weight coatings of Examples 29 and 31.

COMPARATIVE EXAMPLES 30–51

Twenty-two comparative release coatings were formed, vacuum coated, contacted with acetone and analyzed for acetone strippability and metal foil appearance. For each comparative Example, a coating formulation was prepared and coated onto an about 400 gauge unfilled PET film substrate, then tested for acetone removal after deposition thereon of a metallized vacuum-deposited aluminum layer. The results of such tests are shown in Table VIII below. For each comparative Example, the release coating formulation comprised a solution or emulsion of the coating polymer which was applied to the unfilled, untreated (PET) substrate and dried. The coating formulations of the comparative Examples were applied in wet laydown amounts to achieve the dry coating weights indicated in Table VIII. For Comparative Examples 30, 33–42, 50 and 51, the substrate was only uniaxially oriented or stretched in the machine direction at a stretch ratio of about 3.5:1 to about 4:1 before the coating formulation was applied. Then, after the formulation was coated onto the substrate, the coated substrate was oriented or tentered in the transverse direction at a stretch ratio of about 3.5:1 to about 4:1. For Comparative Examples 31, 32 and 43–49, the coating formulations were applied to an already tentered, biaxially oriented PET substrate which had been stretched at a stretch ratio of about 3.5:1 to about 4:1 in each direction. Comparative Examples 31, 32 and 43–49 had very high coating weights because the substrates in those examples were coated using a #3 wire-wound Meyer rod and not subsequently oriented or tentered. The dry coating weights indicated in Table VIII are the coating weights of each sample on its respective fully tentered substrate.

The release coatings were formed by one of two methods: (1) an in-line coating method (ILC) using, for example, a meyer rod or a gravure cylinder, or (2) a hand coating draw down technique (DD) which involved the hand draw-down of a coating solution bead using a wire wound Meyer rod. Any of a variety of coating techniques could have been used, provided the wet laydown amount and the solids content of the coating formulation are selected to provide a desired dry coating weight. Dry coating weights of the applied coatings has been found to be much more determinative of acetone strippability than solids content of the coating formulation or wet laydown amounts.

The dry coating weight could not be calculated for some Comparative Examples because the wet laydown amounts for those samples were not recorded.

Although some of the coating weights are not reported, Comparative Examples 43–49 had very heavy coating weights because the substrates in those samples were coated using a draw down technique and a #3 wire-wound Meyer rod. The coating weights of Comparative Examples 43–49 were also heavy because the substrate was not subsequently oriented or tentered after the release coating was applied thereto, which otherwise can reduce coating thickness to about 25% of its pre-stretched thickness. The dry coating weights indicated in Table VIII are the coating weights of each sample on its respective fully tentered substrate.

In Comparative Example 41, NALCO 1060 is a finely divided silica slip agent having an average particle size of about 60 millimicrons, available from Nalco Chemical Company, Chicago, Illinois. In Comparative Examples 30 and 44, Rhoplex B-85 is a polymethyl methacrylate polymer available from Rohm & Haas, Philadelphia, Pennsylvania. In Comparative Example 31, Methocel is a hydroxypropyl methylcellulose polymer available from Dow Chemical Company, Midland, Mich. In Comparative Example 32, Duroset E200 is an ethylene/vinyl acetate polymer available from National Starch and Chemical Company, Bridgewater, N.J. In Comparative Examples 30, 35–38 and 46, TRITON X-405 is a nonionic surfactant of the chemical family of alkylaryl polyether alcohols, and is available from Union Carbide, Danbury, Conn. Regarding Comparative Examples 33–39, 45 and 46, the polymer RHOPLEX WL-81 is a copolymer of styrene and acrylic ester available from Rohm & Haas, Philadelphia, Penn. Integrated proton NMR spectra analysis indicates that RHOPLEX WL-81 is a copolymer comprising about 39 mole percent (about 32% by weight) polystyrene and about 61 mole percent (about 69% by weight) poly(n-butyl methacrylate). It is believed that the Rohm & Haas polymer RHOPLEX AC-3001 (Comparative Examples 40, 41 and 49 is similarly a copolymer of styrene and an acrylic ester.

For Comparative Example 42, an aqueous homopolymer dispersion of vinyl acetate was used as the coating formulation. The dispersion was supplied by The Chemical Group, A Unit of Monsanto Company, St. Louis, Mo. as GELVA EMULSION TS-30. The dispersion contained from about 55% to about 58% solids, had a pH of from about 4.5 to about 5.5, a Brookfield Viscosity at 25° C. of between 1200 and 1800 cps when tested with a #3 spindle at 30 rpm, and an average homopolymer particle size of about 0.5 microns. The particles carried an anionic charge.

For Comparative Example 43, the cellulose acetate butyrate was applied from a flammable organic solvent solution. In Comparative Example 47, GLASCOL RP-2 is a proprietary formulation of a carboxylated acrylic polymer available from Allied Colloids, Inc., Suffolk, Va. In Comparative Example 48, ACRYLOID WR-97 is a proprietary water-reducible acrylic solution resin available from Rohm and Haas, Philadelphia, Penn. In Comparative Examples 50 and 51, the polymer ADCOTE 61JH61A is a proprietary polymer available from Morton International, Chicago, Ill. Integrated proton NMR spectra analysis indicates that ADCOTE 61JH61A is a copolymer comprising about 67 mole percent (about 62% by weight) polystyrene and about 33 mole percent (about 38% by weight) poly(n-butyl acrylate).

For each of the formulations identified as emulsions in Table VIII, the formulation comprised a fluid consisting of a microscopically heterogeneous mixture of the coating polymer suspended in deionized water. Proprietary emulsifiers were incorporated into the emulsions by the respective suppliers. Some of the emulsions were diluted with deionized water to obtain lower solids contents.

After the release coating formulations were allowed to dry, a layer of aluminum metal was vacuum deposited on each release coating in a bell jar metallizer. The vacuum deposited aluminum metallized layer had a thickness of from about 400 angstroms to about 600 angstroms. The aluminum coated samples were then immersed in room-temperature acetone and agitated to determine if the aluminum layer could be removed by acetone-stripping the release coating. No scrubbing or scraping of the aluminum metal layer was used to facilitate release.

Acetone strippability for each of Comparative Examples 30–51 is shown in Table VIII below. In the evaluation of the metal foil appearance reported in Table VIII, the term "clear" means that the metal foil appearance was bright, shiny, had very high reflectance, and was mirror-like in appearance, as opposed to being hazy or otherwise dull or cloudy.

In Table VIII, "slight" removal is from about 5% removal to about 10% removal and "partial" removal is from about 10% removal to about 25% removal.

TABLE VIII

| EXAMPLE | COATING FORMULATION | EMULSION or SOLUTION | CHEMICAL TYPE OF COATING POLYMER | ILC or DRAW DOWN (DD) | COATING WEIGHT Dry mg/m$^2$ | ACETONE REMOVAL | METAL FOIL APPEARANCE |
|---|---|---|---|---|---|---|---|
| Comparative 30 | 10% Rhoplex B-85 0.1% Triton X-405 | EMULSION | Polymethyl methacrylate | ILC | 65.5 | none | slightly hazy |
| Comparative 31 | 2.5% Methocel | EMULSION | Hydroxypropyl methylcellulose | DD | 190.0 | none | clear |
| Comparative 32 | 50% Duroset E200 | EMULSION | Ethylene-vinyl acetate | DD | 3800 | none | hazy |
| Comparative 33 | 40% Rhoplex WL-81 Corona on | EMULSION | Methacrylate-styrene copolymer | ILC | 801.5 | none | slightly hazy |
| Comparative 34 | 20% Rhoplex WL-81 Corona on | EMULSION | Methacrylate-styrene copolymer | ILC | 362.1 | none | slightly hazy |
| Comparative 35 | 40% Rhoplex WL-81 0.2% Triton X-405 Corona on | EMULSION | Methacrylate-styrene copolymer | ILC | 660.5 | none | slightly hazy |
| Comparative 36 | 40% Rhoplex WL-81 0.2% Triton X-405 Corona off | EMULSION | Methacrylate-styrene copolymer | ILC | — | none | very slightly hazy |
| Comparative 37 | 20% Rhoplex WL-81 0.1% Triton X-405 Corona on | EMULSION | Methacrylate-styrene copolymer | ILC | — | none | slightly hazy |
| Comparative 38 | 20% Rhoplex WL-81 0.1% Triton X-405 Corona off | EMULSION | Methacrylate-styrene copolymer | ILC | 319.6 | none | slightly hazy |
| Comparative 39 | 20% Rhoplex WL-81 Corona on | EMULSION | Methacrylate-styrene copolymer | ILC | 330.2 | none | slightly hazy |
| Comparative 40 | 40% Rhoplex AC-3001 Corona on | EMULSION | Acrylic | ILC | 623.2 | none | slightly hazy |

TABLE VIII-continued

| EXAMPLE | COATING FORMULATION | EMULSION or SOLUTION | CHEMICAL TYPE OF COATING POLYMER | ILC or DRAW DOWN (DD) | COATING WEIGHT Dry mg/m$^2$ | ACETONE REMOVAL | METAL FOIL APPEARANCE |
|---|---|---|---|---|---|---|---|
| Comparative 41 | 20% Rhoplex AC-3001 plus 2% NALCO 1060 | EMULSION | Acrylic | ILC | 330.4 | none | hazy |
| Comparative 42 | 6% Gelva TS-30 | EMULSION | Vinyl acetate homopolymer | ILC | 67 | none | hazy |
| Comparative 43 | Cellulose acetate butyrate | ORGANIC SOLUTION | Cellulose acetate butyrate | DD | very heavy | complete | clear |
| Comparative 44 | Rhoplex B-85 | EMULSION | Polymethyl methacrylate | DD | very heavy | complete | clear |
| Comparative 45 | Rhoplex WL-81 | ENULSION | Methacrylate-styrene copolymer | DD | very heavy | complete | very hazy |
| Comparative 46 | 20% Rhoplex WL-81 plus 1% Triton X-405 | EMULSION | Methacrylate-styrene copolymer | DD | 1520 | complete | hazy |
| Comparative 47 | Glascol RP-2 | EMULSION | Carboxylated acrylic | DD | very heavy | slight | clear |
| Coaparative 48 | Acryloid WL-97 | WATER REDUCIBLE SOLUTION | Acrylic solution resin | DD | very heavy | partial | very hazy |
| Comparative 49 | 48% Rhoplex AC-3001 | EMULSION | Acrylic polymer | DD | 3648 | partial | very hazy |
| Comparative 50 | 20% Adcote 61JH61A | EMULSION | Acrylate-styrene copolymer | ILC | 293 | slight | slightly hazy |
| Comparative 51 | 40% Adcote 61JH61A | EMULSION | Acrylate-styrene copolymer | ILC | 329 | complete | hazy |

Table VIII shows that none of Comparative Examples 30–42 exhibited acceptable removal when immersed in acetone. The failure of Comparative Examples 30–42 to strip renders the strippable release coatings according to the present invention even more unexpected and surprising.

Comparative Example 42 demonstrates that a release coating of a homopolymer vinyl acetate applied at a dry coating weight within the range of weights of the present invention does not strip in acetone.

Although the release coating for each of Comparative Examples 43–51 exhibited acceptable strippability in acetone, all were too heavy to be commercially practicable. Of the acetone-strippable comparative samples, only Comparative Examples 43,44 and 47 produced vacuum-deposited aluminum layers which had a clear metallized foil appearance. Comparative Examples 45, 46 and 48–51 each produced a vacuum-deposited aluminum layer having a hazy metallized foil appearance.

Despite its clear metallized foil appearance, the release coating of Comparative Example 43 was not in-line coated but instead was drawn down by hand from a flammable organic solution of cellulose acetate butyrate. The cellulose acetate butyrate cannot be coated from a non-flammable aqueous coating emulsion because the polymer is not water emulsifiable. The flammability of the coating solution used in Comparative Example 43 renders the formulation unsuitable for in-line coating procedures where flammable solvents are not used for safety reasons.

Although the Comparative Example 47 sample produced a vacuum-deposited aluminum layer having a clear metallized foil appearance, the GLASCOL RP-2 polymer is a proprietary acrylic polymer and exhibited only slight removal in acetone. Also, the GLASCOL RP-2 polymer of Comparative 47 was coated by a hand draw down technique that results in a thick release coating and high coating weight. It has been found that, in general, release coatings having lighter coating weights tend to be more difficult to strip than those of heavier coating weights. It is believed that when the coating weight is low: (1) some bonding between the overcoated deposited metallized layer and the underlying PET substrate may occur, or (2) the surface area of the coating subject to attack, e.g. the edge of the coating, is too low. For example, Comparative Example 46 was a strippable coating formulation of the RHOPLEX WL-81 polymer having a coating weight of 1520 dry mg/m$^2$, whereas the same polymer with and without TRITON X-405 additive was not strippable at coating weights of from 319.6 dry mg/m$^2$ to 801.5 dry mg/m$^2$, as shown in Comparative Examples 33–35, 38 and 39. Thus, it is expected that commercially applicable dry coating weights of from about 40 dry mg/m$^2$ to about 100 dry mg/m$^2$, for example, as achieved from in-line coating processes, would not provide strippable coatings of the GLASCOL RP-2 polymer used in Comparative Example 47.

Extremely heavy coating weights are particularly necessary for strippable polymers which do not form continuous, homogeneous coatings which are free of voids. However, such coatings generally fail to provide smooth and clear overcoated vacuum deposited metallized layers. For example, Comparative Example 44 had a strippable release coating of polymethyl methacrylate but did not form a smooth and continuous coating. The strippable Comparative Example 44 coating was formed by a draw down technique and is believed to have had a heavy coating weight because there was no subsequent stretching of the PET substrate after the coating formulation was applied. Due to the heavy dry coating weight of the Comparative Example 44 release coating, there was no bonding between the overcoated metallized layer and the underlying PET substrate, but the release coating required an excessive amount of polymer and does not strip when thinner, commercially preferred release coatings are formed as shown in Comparative Example 30.

Comparative Example 30 is comparable to Comparative Example 44 in that the Comparative Example 30 release coating formulation also comprised the polymethyl methacrylate polymer RHOPLEX B-85. Although the Comparative Example 30 sample had a minor amount of added TRITON X-405 surfactant, it is believed that the surfactant had little to no effect on strippability of the polymer. As can be seen from Table VIII, the Comparative Example 30 sample had a light dry coating weight (65.5 mg/m²) provided by the in-line coating process and subsequent substrate stretching, and was not strippable in acetone. It is apparent that the coating weight of the Comparative Example 30 sample was not heavy enough to prevent some bonding of the overcoated vacuum-deposited metal layer to the underlying PET substrate.

We claim:

1. A method of making a thin layer or flakes of material comprising:

providing a substrate having a surface, forming a release coating on said surface, said release coating comprising at least one polymer selected from the group consisting of: copolymers of methylmethacrylate and ethylacrylate; and polyacrylic acid homopolymers, said polymer being soluble in a solvent, said release coating being of sufficient coating weight such that a layer of a second material deposited upon said release coating is released as a layer or flakes when contacted with said solvent, forming a layer of a second material on said release coating, said second material being at least substantially insoluble in said solvent, and contacting said release coating with said solvent to dissolve said release coating and release said layer of second material as a thin layer or flakes substantially free of release coating.

2. A method as in claim 1 wherein said polymer is a polyacrylic acid homopolymer having a glass transition temperature of about 60° C. or higher, and said release coating is applied on said substrate at a coating weight of from about 25 dry mg/m² to about 1000 dry mg/m².

3. A method as in claim 1 wherein said polymer is a copolymer of methylmethacrylate and ethylacrylate and said release coating is formed on said substrate at a coating weight of from about 40 dry mg/m² to about 100 dry mg/m².

4. A method as in claim 1 wherein said release coating is applied on said substrate at a coating weight of from about 40 dry mg/m² to about 200 dry mg/m².

5. A method as in claim 1 wherein forming a release coating comprises:

forming a release coating emulsion of said polymer, said emulsion comprising a nonionic surfactant in an amount sufficient to prevent post-emulsion polymerization agglomeration of said polymer, and comprising an anionic surfactant in an amount sufficient to emulsify precursor monomers of said polymer during an emulsion polymerization reaction of said monomers, coating said release coating emulsion on said substrate to form a coated substrate, and drying said release coating emulsion to evaporate volatiles in said emulsion and form said release coating.

6. A method as in claim 5, wherein said method further includes stretching said coated substrate subsequent to forming said release coating thereon and prior to forming said layer of second material thereon.

7. A method as in claim 1 wherein said polymer comprises a copolymer of methylmethacrylate and ethylacrylate.

8. A method as in claim 7 wherein said polymer comprises a copolymer formed from about 73.5% by weight to about 85% by weight methylmethacrylate and from about 15% by weight to about 26.5% by weight ethylacrylate.

9. A method as in claim 7 wherein said copolymer has a weight average molecular weight of from about $1.0 \times 10^5$ g/mol to about $2.0 \times 10^5$ g/mol.

10. A method as in claim 1 wherein said polymer is a methylmethacrylate-ethylacrylate copolymer having a glass transition temperature of from about 60° C. to about 70° C.

11. A method as in claim 1 wherein said polymer comprises an essentially pure polyacrylic acid homopolymer having a glass transition temperature of from about 100° C. to about 110° C.

12. A method as in claim 1 wherein said polymer comprises a substantially pure polyacrylic acid homopolymer and forming the release coating comprises:

forming a hydrophilic colloidal release coating solution of said homopolymer, coating said release coating solution on said substrate to form a coated substrate, and drying said release coating solution to evaporate volatiles from said solution and form said release coating.

13. A method as in claim 1 wherein said release coating further comprises a film-forming additive selected from the group consisting of glycerine, polyethylene glycol, ethylene glycol, diethylene glycol, and triethylene glycol (TEG), in an amount effective to enhance film formation of said release coating.

14. A method as in claim 1 wherein said substrate comprises a flexible film of polyethylene terephthalate.

15. A method as in claim 1 wherein said substrate comprises a slip agent filled polyethylene terephthalate.

16. A method as in claim 1 wherein said layer of second material comprises a multilayered optically variable coating material.

17. A method as in claim 1 wherein forming said layer of second material comprises a vacuum deposition of a metallized layer.

18. A method as in claim 1 wherein said substrate comprises a flexible web, providing a substrate comprises extruding a polymeric web, and forming a release coating on said surface includes in-line coating the surface of the extruded polymeric web with said polymer.

19. A method as in claim 1 wherein providing a substrate includes corona discharge treating said surface prior to forming said release coating thereon.

20. A method as in claim 1 wherein said solvent comprises acetone.

21. A method as in claim 1 wherein contacting said release coating with said solvent further comprises causing said layer of second material to flake off of said substrate.

22. A method as in claim 1 wherein forming said layer of second material comprises vacuum depositing at least one metallized layer, and said release coating consists essentially of said polymer and is substantially free of additives which would volatilize and degas upon vacuum metallization of said layer.

23. In combination, a substrate and a release coating formed thereon, said substrate comprising a film of a polymeric material, said release coating being soluble in a solvent and being of sufficient coating weight such that a layer of a metal or metal oxide material deposited upon said release coating is released as a layer or substantially readily formed into flakes when contacted with said solvent, said release coating comprising at least one polymer selected from the group consisting of: copolymers of methylmethacrylate and ethylacrylate; and polyacrylic acid homopolymers, and wherein said substrate is reclaimable.

24. A combination as in claim 23 wherein said polymer comprises a copolymer formed of from about 73.5% by weight to about 85% by weight methylmethacrylate and from about 15% by weight to about 26.5% by weight ethylacrylate.

25. A combination as in claim 23 wherein said polymer comprises a methylmethacrylate-ethylacrylate copolymer having a glass transition temperature of from about 60° C. to about 70° C.

26. A combination as in claim 23 wherein said polymer comprises a methylmethacrylate-ethylacrylate copolymer having a weight average molecular weight of from about $1.0 \times 10^5$ g/mol to about $2.0 \times 10^5$ g/mol.

27. A combination as in claim 23 wherein said polymer comprises an essentially pure polyacrylic acid homopolymer having a glass transition temperature of about 100° C. or higher.

28. A combination as in claim 23 wherein said polymer comprises a substantially pure polyacrylic acid homopolymer and said release coating has been formed from a hydrophilic colloidal release coating solution or emulsion of said homopolymer.

29. A combination as in claim 23 wherein said substrate comprises a flexible film of polyethylene terephthalate.

30. A combination as in claim 23 wherein said substrate comprises a slip agent filled polyethylene terephthalate.

31. A combination as in claim 23 further comprising a layer of a second material deposited on said release coating, said layer of second material comprising a multilayered optically variable coating material.

32. A combination as in claim 23 further comprising a clear metallized layer of vacuum deposited metal applied on said release coating.

33. A combination as in claim 23 wherein said release coating consists essentially of said polymer and is substantially free of additives which degas upon vacuum deposition of a metallized layer on said release coating.

34. A combination as in claim 23 wherein said polymer is soluble in acetone.

35. A combination as in claim 23 wherein said polymer comprises a methylmethacrylate-ethylacrylate copolymer, said release coating has a first side contacting said substrate and an opposite exposed second side, said coating has a coating weight sufficient to prevent bonding of a metallized layer deposited on said second side to said substrate, and said polymer has a glass transition temperature that is sufficiently high to avoid substantial deformation of said coating upon exposure of said coating to temperatures associated with the vacuum deposition of metal on said second surface and sufficiently low to avoid the formation of nodules and polymer agglutination at a coating weight sufficient to prevent bonding of a metallized layer deposited on said second side to said substrate.

36. A combination as claimed in claim 35 wherein said polymer has a glass transition temperature of below about 60° C. and said coating has a dry coating weight of from about 40 mg/m² to about 225 mg/m².

37. A combination as claimed in claim 35 wherein said polymer has a glass transition temperature of from about 60° C. to about 69° C. and said coating has a dry coating weight of from about 29 mg/m² to about 100 mg/m².

38. A combination as claimed in claim 35 wherein said polymer has a glass transition temperature of about 70° C. or higher and said coating has a dry coating weight of from about 40 mg/m² to about 100 mg/m².

39. A combination as in claim 23 wherein said polymer comprises an essentially pure polyacrylic acid homopolymer and said release coating has a dry coating weight on said substrate of from about 25 mg/m² to about 1000 mg/m².

40. A method of making a thin layer or flakes of material comprising:

providing a substrate having a surface, forming a release coating on said surface, said release coating comprising at least one polymer selected from the group consisting of: copolymers of methylmethacrylate and ethylacrylate; and polyacrylic acid homopolymers, said polymer being soluble in a solvent, said release coating being of sufficient coating weight such that a layer of a second material deposited upon said release coating is released as a layer or flakes when contacted with said solvent, forming a layer of a second material on said release coating, said second material being at least substantially insoluble in said solvent, and contacting said release coating with said solvent at ambient temperature to dissolve said release coating and release said layer of second material as a thin layer or flakes.

41. A method of making a thin layer or flakes of material comprising:

providing a substrate having a surface, forming a release coating on said surface, said release coating comprising at least one polymer selected from the group consisting of: copolymers of methylmethacrylate and ethylacrylate; and polyacrylic acid homopolymers, said polymer being soluble in a solvent, said release coating being of sufficient coating weight such that a layer of a second material deposited upon said release coating is released as a layer or flakes when contacted with said solvent, forming a layer of a second material on said release coating, said second material being substantially nonpolymeric and at least substantially insoluble in said solvent, and contacting said release coating with said solvent to dissolve said release coating and release said layer of second material as a thin layer or flakes.

42. The method of claim 41, wherein said second material is selected from the group consisting of metal, metal oxide, and combinations thereof.

43. The method of claim 41, wherein said layer of a second material is applied by vacuum deposition.

44. The method of claim 41, wherein said layer of a second material is substantially continuous.

45. The method of claim 41, wherein said layer of a second material has a thickness of up to about 600 angstroms.

* * * * *